United States Patent
Ylamurto et al.

(10) Patent No.: US 10,536,901 B2
(45) Date of Patent: *Jan. 14, 2020

(54) SYSTEMS AND METHODS FOR PROVIDING COMMUNICATIONS WITHIN WIRELESS SENSOR NETWORKS BASED ON A PERIODIC BEACON SIGNAL

(71) Applicant: Locix Inc., San Bruno, CA (US)

(72) Inventors: Tommi Ylamurto, Los Gatos, CA (US); Vikram Pavate, Foster City, CA (US); Elad Alon, El Cerrito, CA (US); Vivek Subramanian, Orinda, CA (US)

(73) Assignee: Locix, Inc., San Bruno, CA (US)

( * ) Notice: Subject to any disclaimer, the term of this patent is extended or adjusted under 35 U.S.C. 154(b) by 96 days.

This patent is subject to a terminal disclaimer.

(21) Appl. No.: 15/007,119

(22) Filed: Jan. 26, 2016

(65) Prior Publication Data
US 2016/0219517 A1    Jul. 28, 2016

Related U.S. Application Data

(63) Continuation-in-part of application No. 14/925,889, filed on Oct. 28, 2015, and a continuation-in-part of
(Continued)

(51) Int. Cl.
*H04L 12/50*    (2006.01)
*H04W 52/02*    (2009.01)
(Continued)

(52) U.S. Cl.
CPC ......... *H04W 52/0219* (2013.01); *H04W 4/70* (2018.02); *H04W 8/005* (2013.01);
(Continued)

(58) Field of Classification Search
CPC ...................................................... H04W 4/00
(Continued)

(56) References Cited

U.S. PATENT DOCUMENTS 8,121,080 B2    2/2012 Ham et al.
2003/0169697 A1    9/2003 Suzuki et al.
(Continued)

FOREIGN PATENT DOCUMENTS

EP    3251426    12/2017
JP    2010251887    11/2010
(Continued)

OTHER PUBLICATIONS

Anastasi, Giuseppe, et al., "Energy conservation in wireless sensor networks: A survey", *Ad Hoc Networks* 7, No. 3 (2009): pp. 537-568.
(Continued)

*Primary Examiner* — Dang T Ton
(74) *Attorney, Agent, or Firm* — Jaffery Watson Mendonsa & Hamilton LLP

(57) ABSTRACT

In one embodiment, a system includes a hub having one or more processing units and RF circuitry for transmitting and receiving communications in a wireless network architecture. The system includes a plurality of sensor nodes each having a wireless device with a transmitter and a receiver to enable bi-directional communications with the hub in the wireless network architecture. The one or more processing units of the hub are configured to execute instructions to determine a first scheduled timing of causing the transmitter to be operable to transmit and causing the receiver to be operable to receive for each wireless device based on a periodic beacon signal of the hub.

20 Claims, 16 Drawing Sheets

Related U.S. Application Data application No. 14/607,045, filed on Jan. 27, 2015, now Pat. No. 9,380,531.

(51) Int. Cl.
*H04W 8/00* (2009.01)
*H04W 74/04* (2009.01)
*H04W 4/70* (2018.01)
*H04W 84/18* (2009.01)

(52) U.S. Cl.
CPC ....... *H04W 52/0216* (2013.01); *H04W 74/04* (2013.01); *H04W 84/18* (2013.01); *Y02D 70/00* (2018.01); *Y02D 70/1224* (2018.01); *Y02D 70/1262* (2018.01); *Y02D 70/142* (2018.01); *Y02D 70/144* (2018.01); *Y02D 70/162* (2018.01); *Y02D 70/22* (2018.01)

(58) Field of Classification Search
USPC .......................................................... 370/329
See application file for complete search history.

(56) References Cited

U.S. PATENT DOCUMENTS

| | | | |
|---|---|---|---|
| 2006/0227729 | A1 | 10/2006 | Budampati et al. |
| 2008/0253327 | A1 | 10/2008 | Kohvakka et al. |
| 2009/0103469 | A1 | 4/2009 | Smith et al. |
| 2010/0110888 | A1 | 5/2010 | Park et al. |
| 2010/0226342 | A1 | 9/2010 | Colling et al. |
| 2011/0188391 | A1* | 8/2011 | Sella ............. H04W 24/10 370/252 |
| 2011/0299423 | A1 | 12/2011 | Shim et al. |
| 2012/0092155 | A1 | 4/2012 | Abedi |
| 2012/0207062 | A1 | 8/2012 | Corbellini et al. |
| 2013/0023278 | A1 | 1/2013 | Chin |
| 2013/0195083 | A1 | 8/2013 | Kim et al. |
| 2013/0208667 | A1* | 8/2013 | Merlin ............ H04W 68/02 370/329 |
| 2014/0023049 | A1 | 1/2014 | Strecker |
| 2014/0046495 | A1 | 2/2014 | Magnussen et al. |
| 2014/0192695 | A1 | 7/2014 | Priyantha et al. |
| 2014/0249688 | A1 | 9/2014 | Ansari et al. |
| 2014/0293850 | A1 | 10/2014 | Huang et al. |
| 2015/0078232 | A1 | 3/2015 | Djinki |
| 2016/0373940 | A1 | 12/2016 | Splitz et al. |
| 2017/0070992 | A1 | 3/2017 | Matsuo |
| 2017/0127410 | A1 | 5/2017 | Ylamurto |

FOREIGN PATENT DOCUMENTS

| | | |
|---|---|---|
| JP | 2013172227 | 9/2013 |
| JP | 2014-135764 | 7/2014 |
| WO | 2010143756 | 12/2010 |
| WO | WO-2010143756 | 12/2010 |
| WO | 2013106441 | 7/2013 |
| WO | 2014007417 A1 | 1/2014 |
| WO | 2014197585 | 12/2014 |
| WO | 2016123249 A1 | 8/2016 |

OTHER PUBLICATIONS

Darif, Anouar, et al., "Performance Evaluation of IR-UWB Compared to Zigbee in Real time Applications for Wireless Sensor Networks", *Journal of Convergence Information Technology 8*, No. 15 (2013).

Gutierrez, Jose A., et al., "IEEE 802.15. 4: a developing standard for low-power low-cost wireless personal area networks", *network, IEEE 15*, No. 5 (2001): pp. 12-19.

Kinney, Patrick, et al., "technology: Wireless control that simply works", *Communications design conference*, vol. 2. 2003.

Lee, Jin-Shyan, et al., "A comparative study of wireless protocols: Bluetooth, UWB, ZigBee, and Wi-Fi", *Industrial Electronics Society, 2007. IECON 2007. 33rd Annual Conference of the IEEE*, pp. 46-51. *IEEE*, 2007.

Lee, Myung J., et al., "Emerging standards for wireless mesh technology", *Wireless Communications, IEEE 13*, No. 2 (2006): 56-63.

Schmid, Thomas, et al., "Disentangling wireless sensing from mesh networking", *Proceedings of the 6th Workshop on Hot Topics in Embedded Networked Sensors*, p. 3. *ACM*, Jun. 28, 2010.

Sugano, Masashi, et al., "Low-Energy-Consumption Ad Hoc Mesh Network Based on Intermittent Receiver-driven Transmission", *ICGST-CNIR Journal*, vol. 9, Issue 1, Jul. 2009, 8 pages.

Notification of International Search Report and Written Opinion for PCT/US2016/015188 dated Jul. 4, 2016, 16 pages.

Office Action for U.S. Appl. No. 14/925,889, dated Feb. 9, 2017, 22 pages.

Extended European Search Report for EP Application No. 16744056. 9, dated Oct. 4, 2018, 10 pages.

Office Action for U.S. Appl. No. 14/925,889, dated Mar. 28, 2018, 30 pages.

Final Office Action for U.S. Appl. No. 14/925,889, dated Sep. 28, 2017, 26 pages.

Final Office Action for U.S. Appl. No. 14/925,889, dated Dec. 4, 2018, 33 pages.

Notice of Allowance for U.S. Appl. No. 14/925,889, dated Jul. 1, 2019, 9 pages.

Rolfe (Blind Creek Associates), TG4k MAC Subgroup consolidated working draft contribution, IEEE 802.15-11/0882r3, Feb. 13, 2012, https://mentor.ieee.org/802.15/dcn/11.

Japanese office action for JP2017558369, 11 pages, dated Nov. 5, 2019.

* cited by examiner

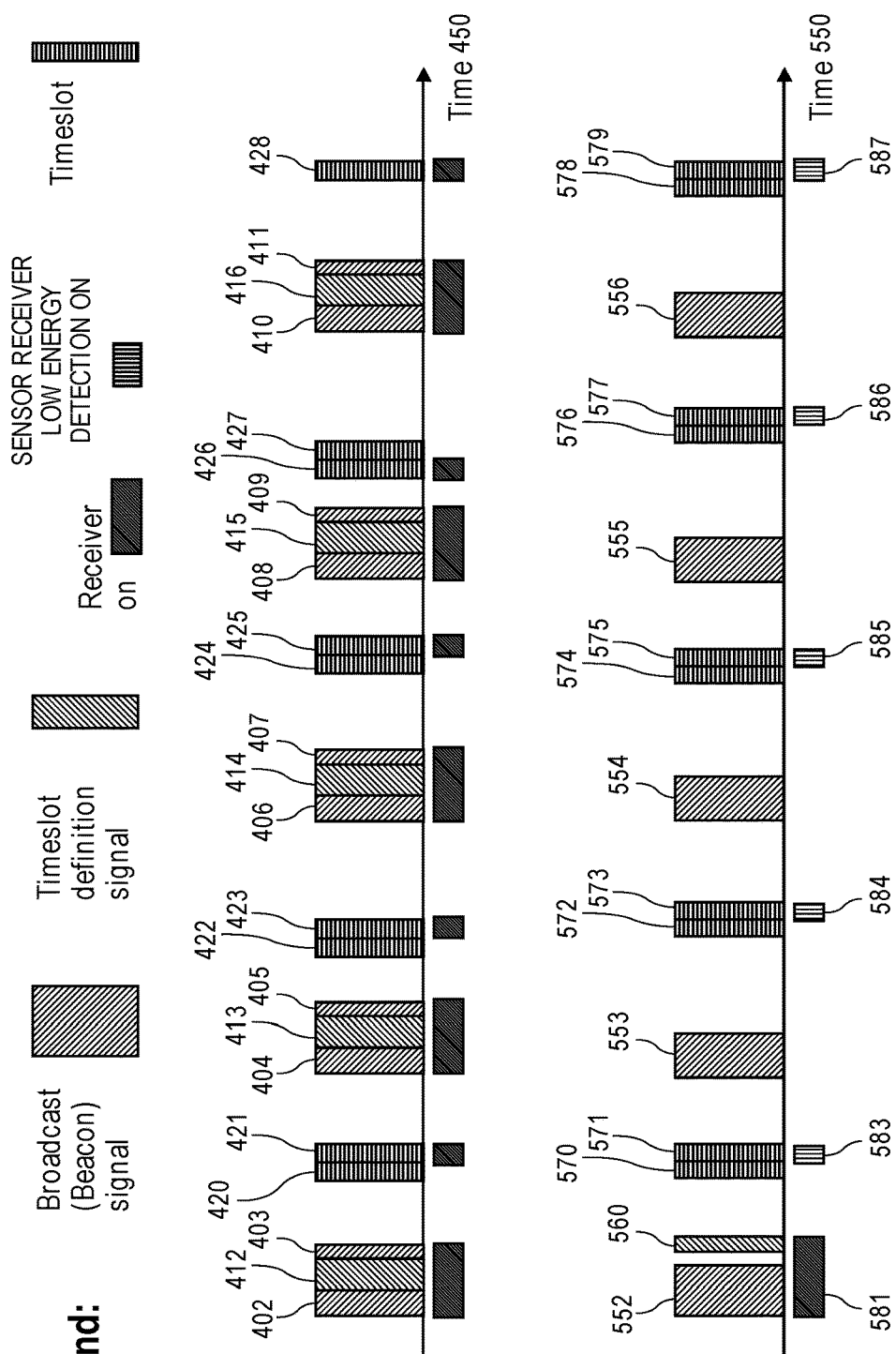

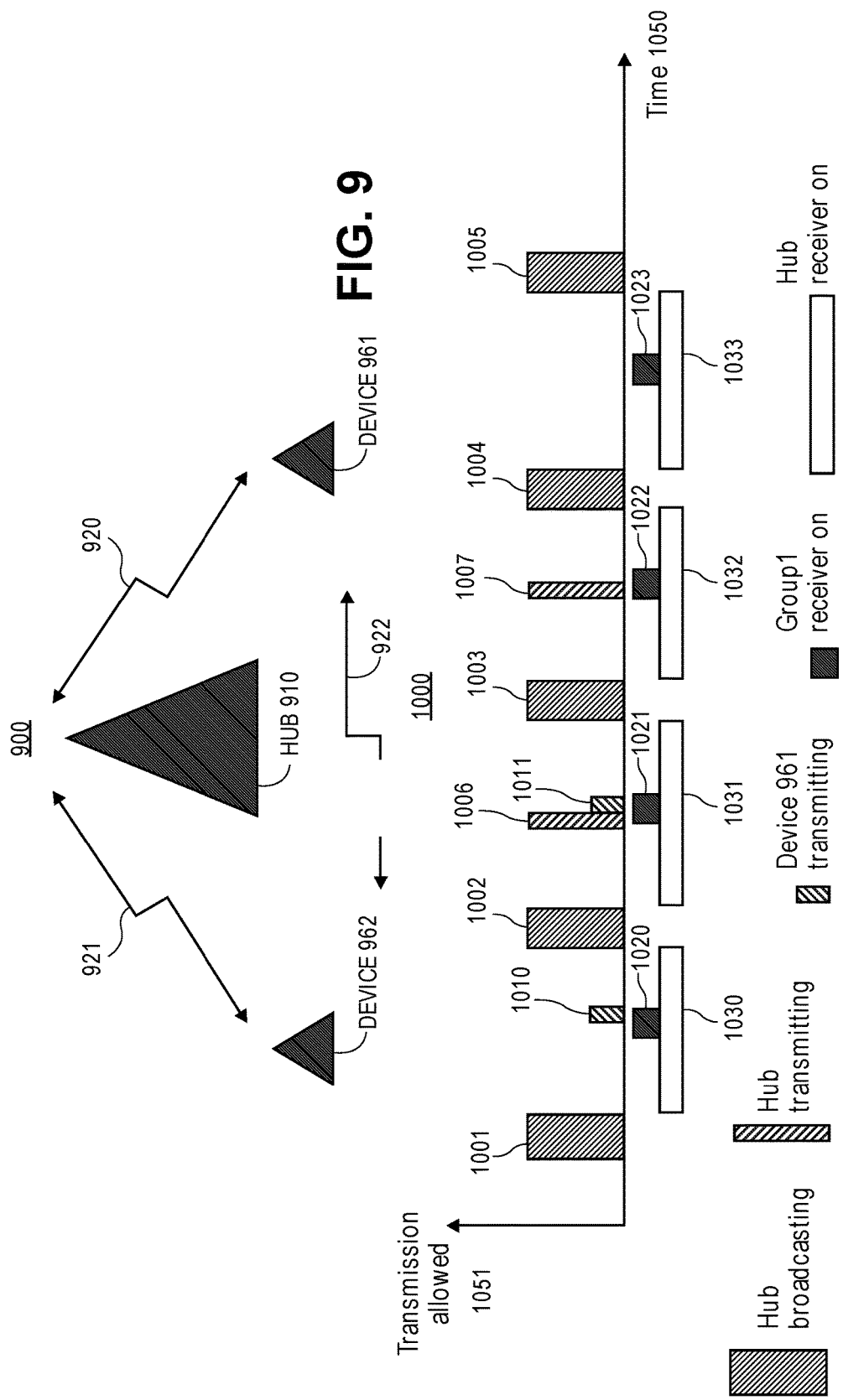

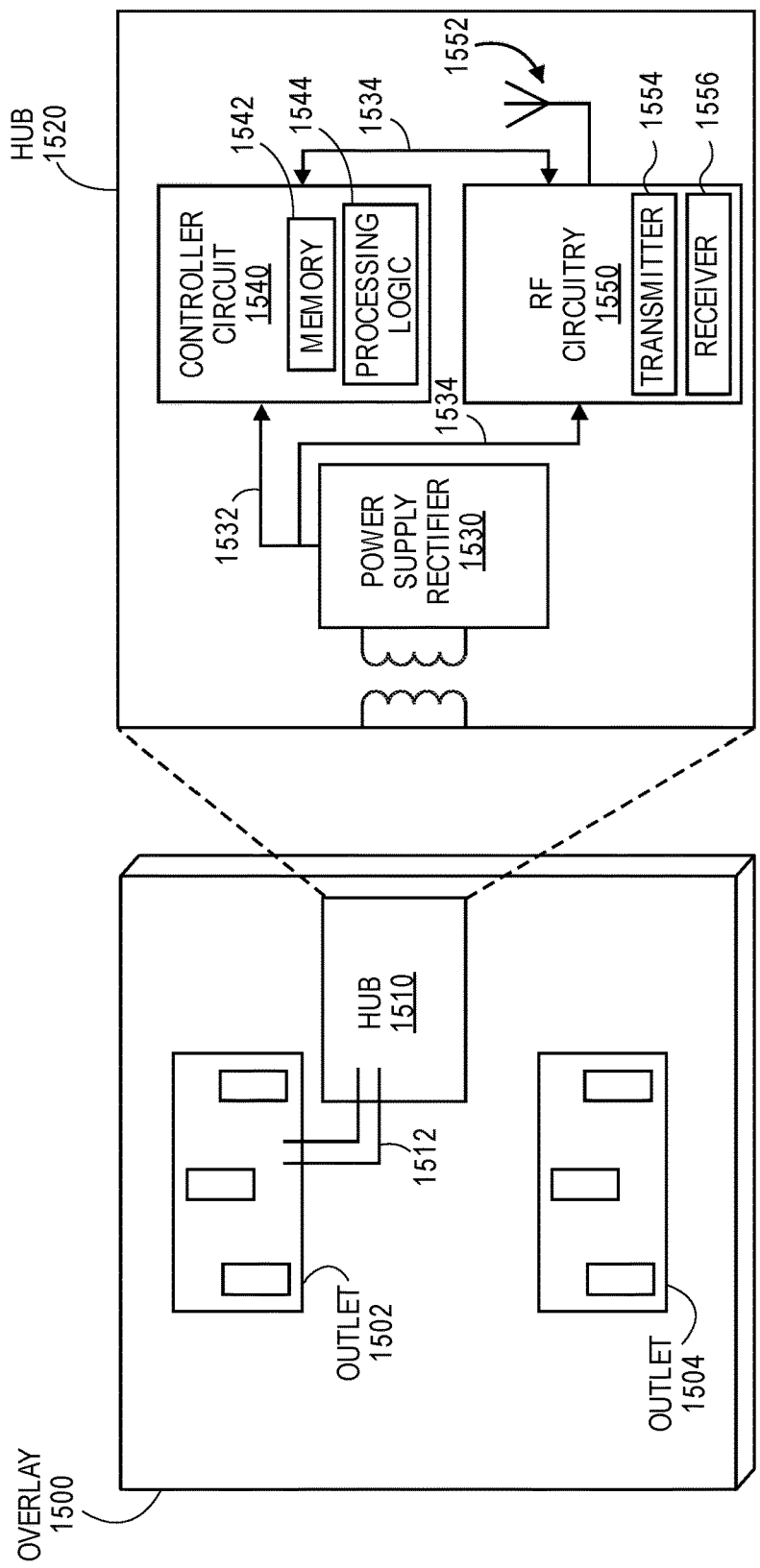

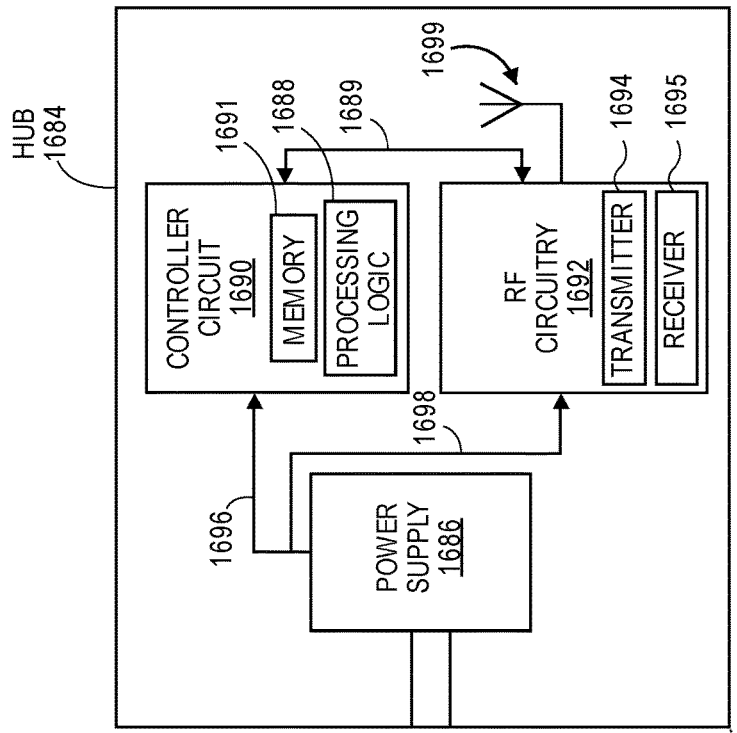
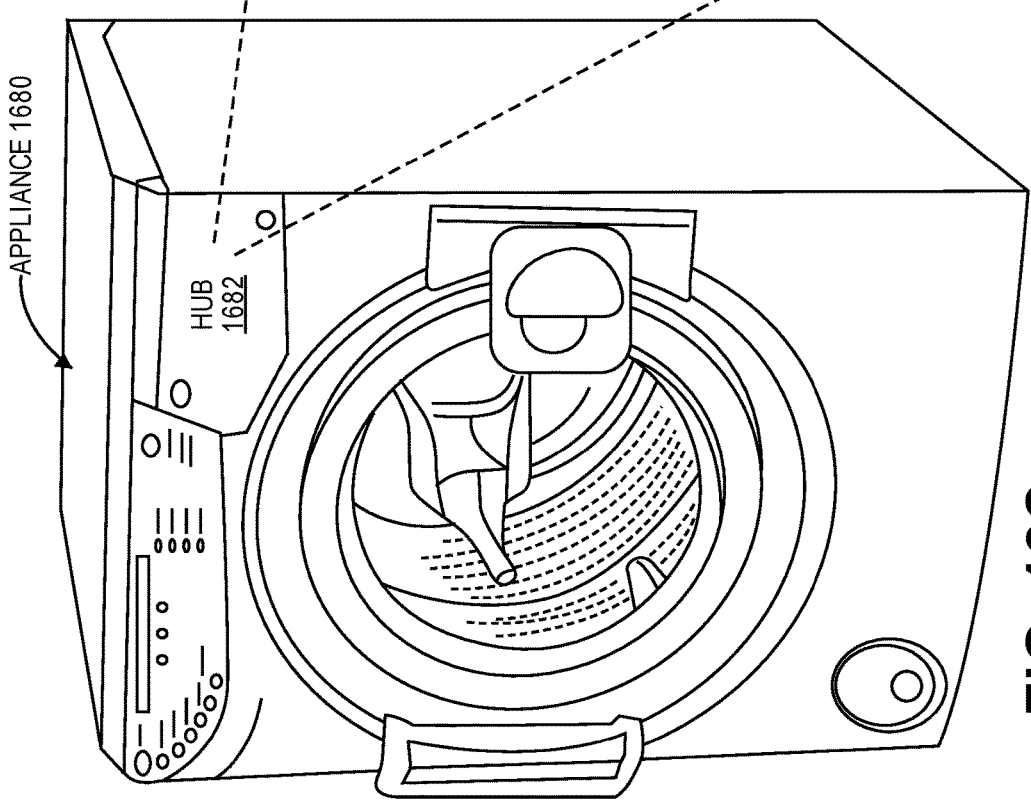
FIG. 12D
FIG. 12C

SYSTEMS AND METHODS FOR PROVIDING COMMUNICATIONS WITHIN WIRELESS SENSOR NETWORKS BASED ON A PERIODIC BEACON SIGNAL

RELATED APPLICATIONS

This application is a Continuation in Part of application Ser. No. 14/607,045, filed Jan. 27, 2015, entitled: SYSTEMS AND METHODS FOR PROVIDING WIRELESS SENSOR NETWORKS WITH AN ASYMMETRIC NETWORK ARCHITECTURE and also a Continuation in Part of application Ser. No. 14/925,889, filed Oct. 28, 2015, entitled SYSTEMS AND METHODS FOR PROVIDING COMMUNICATIONS WITHIN WIRELESS SENSOR NETWORKS BASED ON AT LEAST ONE PERIODIC GUARANTEED TIME SLOT FOR SENSOR NODES, which are incorporated by reference herein.

FIELD

Embodiments of the invention pertain to systems and methods for providing communications within wireless sensor networks based on a periodic beacon signal for sensor nodes.

BACKGROUND

In the consumer electronics and computer industries, wireless sensor networks have been studied for many years. In archetypal wireless sensor networks, one or more sensors are implemented in conjunction with a radio to enable wireless collection of data from one or more sensor nodes deployed within a network. Each sensor node may include one or more sensors, and will include a radio and a power source for powering the operation of the sensor node. Prior wireless systems include a repeating timeslot definition signal for defining a timeslot for wireless nodes in a wireless network. A broadcast beacon signal is periodically repeated for a conventional approach (e.g., IEEE 802.15.4). A timeslot definition signal is periodically repeated to define timeslots. A receiver of a node is operable and powered ON for the broadcast beacon signals, timeslot definition signals, and certain timeslots.

However, the timeslot definition signals are repeated frequently and will become impractically longer for a larger number of timeslots. Also, the nodes consume significant power due to needing to have an operable receiver for receiving the broadcast beacon signals, timeslot definition signals, and certain timeslots.

SUMMARY

For one embodiment of the present invention, systems and methods for providing communications within wireless sensor networks based on a periodic beacon signal for sensor nodes are disclosed herein.

In one example, a system includes a hub having one or more processing units and RF circuitry for transmitting and receiving communications in a wireless network architecture. The system also includes a plurality of sensor nodes each having a wireless device with a transmitter and a receiver to enable bi-directional communications with the hub in the wireless network architecture. The one or more processing units of the hub are configured to execute instructions to determine a first scheduled timing of causing the transmitter to be operable to transmit and causing the receiver to be operable to receive for each wireless device based on a periodic beacon signal of the hub to reduce power consumption of the wireless devices of the plurality of nodes. The hub provides anti-collision features by determining a different second scheduled timing of causing the transmitter to be operable to transmit and causing the receiver to be operable to receive for at least two wireless devices of the plurality of nodes if a collision is detected.

Other features and advantages of embodiments of the present invention will be apparent from the accompanying drawings and from the detailed description that follows below.

BRIEF DESCRIPTION OF THE DRAWINGS

Embodiments of the present invention are illustrated by way of example and not limitation in the figures of the accompanying drawings, in which like references indicate similar elements, and in which:

FIG. 4 illustrates a time line having a repeating timeslot definition signal for defining a timeslot for wireless nodes in a wireless network in accordance with a conventional approach.

FIG. 5 illustrates a time line having a non-repeating timeslot definition signal for defining timeslots for wireless nodes in a wireless network architecture in accordance with one embodiment.

FIG. 9 illustrates a network architecture for communications between a hub and a group of devices (e.g., sensor nodes) in accordance with one embodiment.

FIG. 10 illustrates a diagram 1000 having communications being transmitted by a hub and groups of wireless nodes in a wireless network architecture in accordance with one embodiment.

FIG. 11A shows an exemplary embodiment of a hub implemented as an overlay 1500 for an electrical power outlet in accordance with one embodiment.

FIG. 11B shows an exemplary embodiment of an exploded view of a block diagram of a hub 1520 implemented as an overlay for an electrical power outlet in accordance with one embodiment.

FIG. 12C shows an exemplary embodiment of a hub implemented within an appliance (e.g., smart washing machine, smart refrigerator, smart thermostat, other smart appliances, etc.) in accordance with one embodiment.

FIG. 12D shows an exemplary embodiment of an exploded view of a block diagram of a hub 1684 implemented within an appliance (e.g., smart washing machine, smart refrigerator, smart thermostat, other smart appliances, etc.) in accordance with one embodiment.

DETAILED DESCRIPTION

Figure 1:
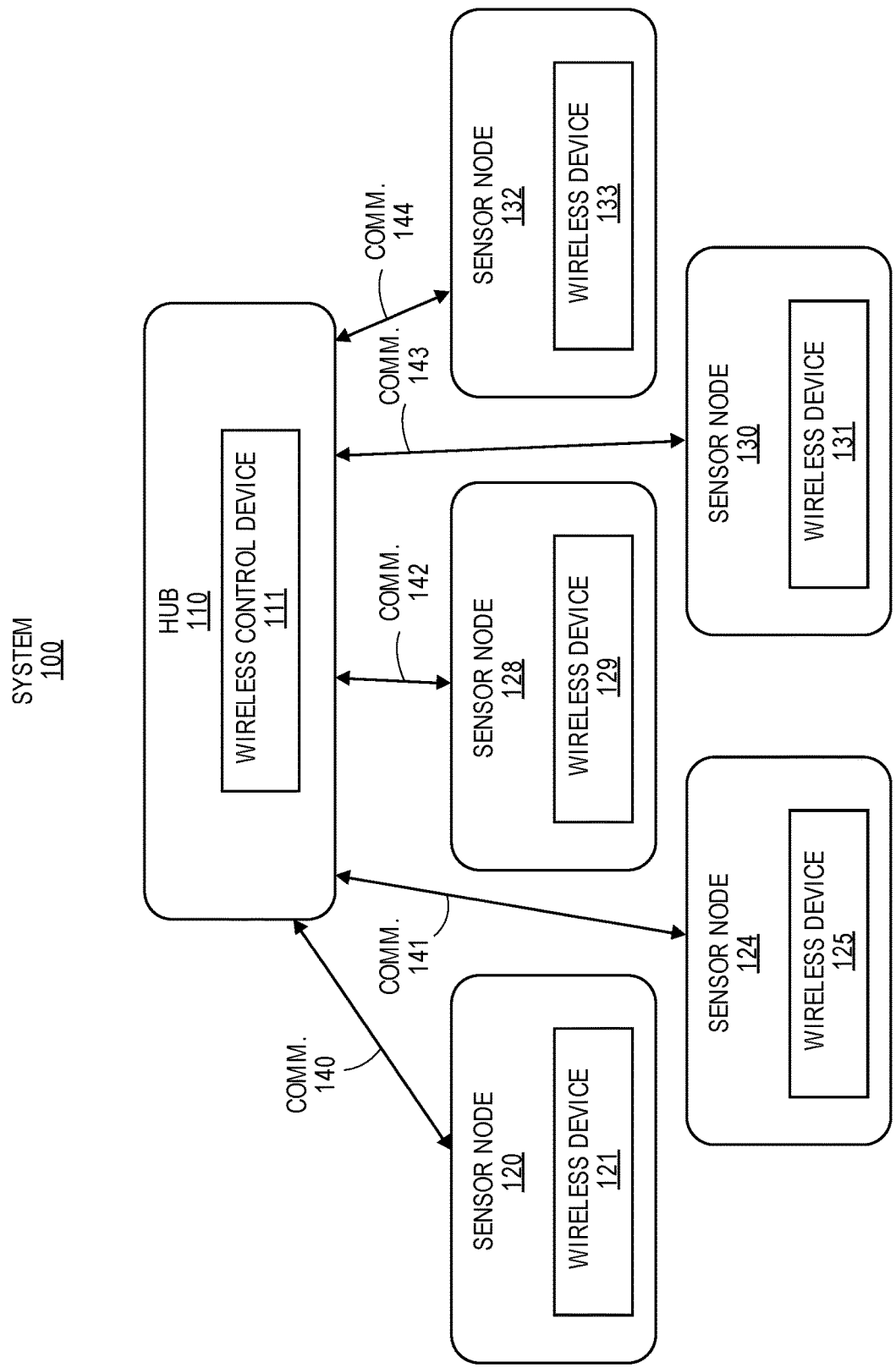
FIG. 1 illustrates an exemplar system of wireless nodes having a periodic guaranteed time slot for communicating in accordance with one embodiment.

Systems and methods for providing communications within wireless sensor networks based on a periodic beacon signal for sensor nodes are disclosed herein. In one embodiment, a system includes a hub having one or more processing units and RF circuitry for transmitting and receiving communications in a wireless network architecture. The system also includes a plurality of sensor nodes each having a wireless device with a transmitter and a receiver to enable bi-directional communications with the hub in the wireless network architecture. The one or more processing units of the hub are configured to execute instructions to determine a first scheduled timing of causing the transmitter to be operable to transmit and causing the receiver to be operable to receive for each wireless device based on a periodic beacon signal of the hub to reduce power consumption of the wireless devices of the plurality of nodes. The hub provides anti-collision features by determining a different second scheduled timing of causing the transmitter to be operable to transmit and causing the receiver to be operable to receive for at least two wireless devices of the plurality of nodes.

The hub can include RF circuitry that is operable during relevant time periods for receiving and transmitting communications to sensors nodes in wireless networks, particularly in indoor environments. For the purpose of this, indoor environments are also assumed to include near-indoor environments such as in the region around building and other structures, where similar issues (e.g., presence of nearby walls, etc.) may be present.

In one embodiment, sensor nodes of the present design consume significantly less power in comparison to power consumption of nodes of prior approaches at least partially due to having a receiver of the sensor nodes of the present design operable for a shorter time period. The non-repeating timeslot definition signal also saves time and reduces network congestion and bandwidth requirements in comparison to the prior approaches which require the timeslot definition signal to be repeated frequently.

In one embodiment, an asymmetry in power availability may be exploited to provide long range of communication in a wireless asymmetric network architecture while maintaining long battery life for nodes that are powered by a battery source. In an exemplary embodiment, a communication range of 20 meters between communicating nodes may be achieved while providing a long battery life (e.g., approximately 10 years, at least ten years) in battery operated nodes. This may be achieved by implementing an energy aware networking protocol in accordance with embodiments of this invention. Specifically, a tree-like network architecture having mesh based features may be used where long-life battery operated nodes are used on the terminal ends of the tree.

An exemplar tree-like network architecture has been described in U.S. patent application Ser. No. 14/607,045 filed on Jan. 29, 2015, U.S. patent application Ser. No. 14/607,047 filed on Jan. 29, 2015, U.S. patent application Ser. No. 14/607,048 filed on Jan. 29, 2015, and U.S. patent application Ser. No. 14/607,050 filed on Jan. 29, 2015, which are incorporated by reference in entirety herein.

A wireless sensor network is described for use in an indoor environment including homes, apartments, office and commercial buildings, and nearby exterior locations such as parking lots, walkways, and gardens. The wireless sensor network may also be used in any type of building, structure, enclosure, vehicle, boat, etc. having a power source. The sensor system provides good battery life for sensor nodes while maintaining long communication distances.

FIG. 1 illustrates an exemplar system of wireless nodes having a periodic guaranteed time slot for communicating in accordance with one embodiment. The system 100 primarily has a tree network architecture that is capable of mesh-like network functionality in accordance with one embodiment. The system 100 primarily has a tree network architecture for standard communications (e.g., (e.g., node identification information, sensor data, node status information, synchronization information, localization information, other such information for the wireless sensor network, time of flight (TOF) communications, etc.). The system 100 includes a hub 110 having a wireless control device 111, a sensor node 120 having a wireless device 121, a sensor node 124 having a wireless device 125, a sensor node 128 having a wireless device 129, a sensor node 130 having a wireless device 131, and a sensor node 132 having a wireless device 133. Additional hubs that are not shown can communicate with the hub 110 or other hubs. Each hub communicates bi-directionally with the sensor nodes 120, 124, 128, 130, and 132. The hubs are also designed to communicate bi-directionally with other devices (e.g., client device, mobile device, tablet device, computing device, smart appliance, smart TV, etc.).

In one embodiment, the control device 111 of the hub 110 is configured to execute instructions to determine or negotiate a timing of at least one periodic guaranteed time slot for the sensor nodes (e.g., nodes 120, 124, 128, 130, 132) one time using a single non-repeating timeslot definition signal. The hub is also configured to determine a first scheduled timing of causing the transmitter to be operable to transmit and causing the receiver to be operable to receive for each wireless device based on a periodic beacon signal of the hub to reduce power consumption of the wireless devices of the plurality of nodes. The hub provides anti-collision features by determining a different second scheduled timing of causing the transmitter to be operable to transmit and causing the receiver to be operable to receive for at least two wireless devices of the plurality of nodes if a collision is detected.

A sensor node is a terminal node if it only has upstream communications with a higher level hub or node and no downstream communications with another hub or node. Each wireless device includes RF circuitry with a transmitter and a receiver (or transceiver) to enable bi-directional communications with hubs or other sensor nodes.

Figure 2:
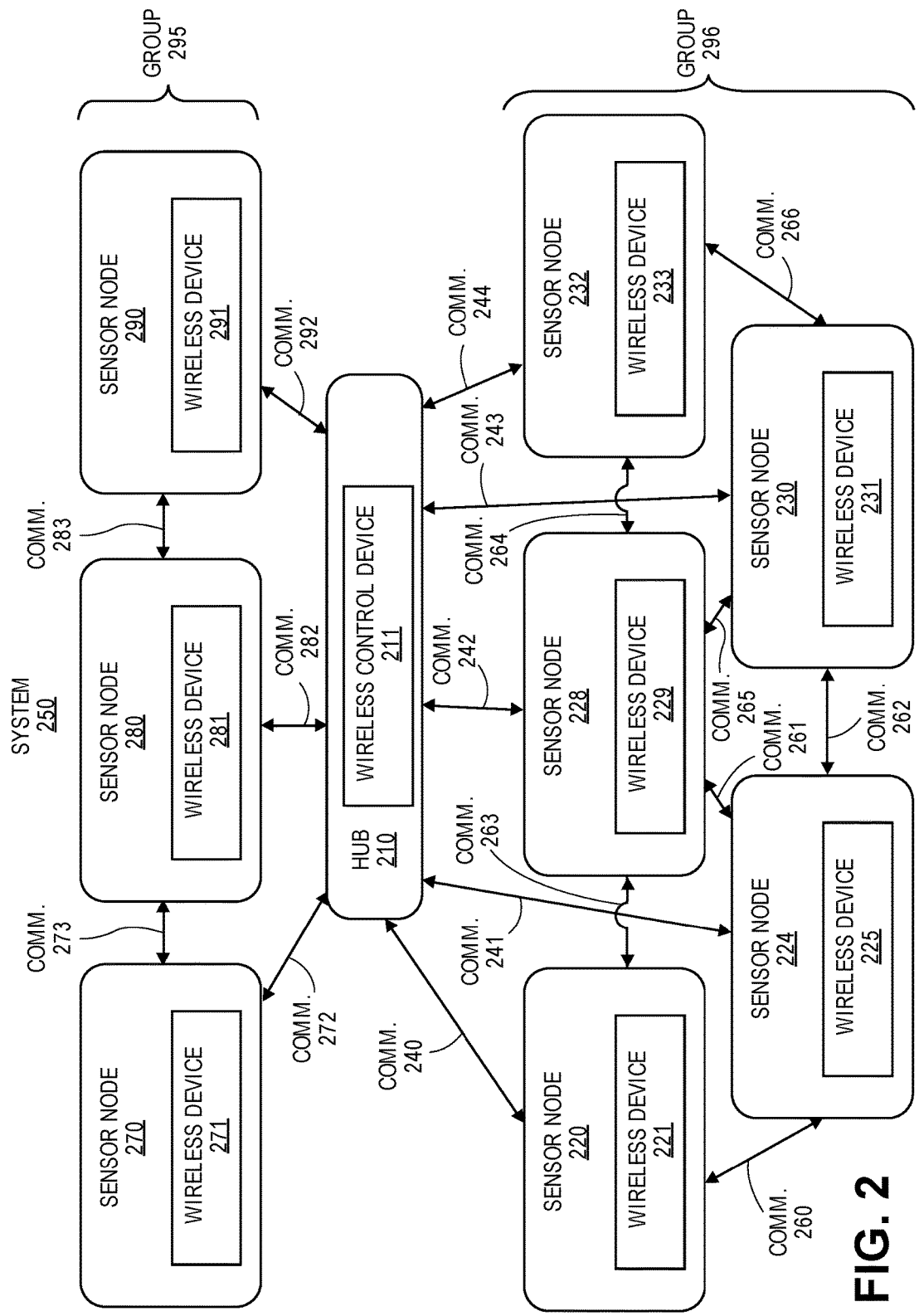
FIG. 2 shows a system primarily having a tree network architecture that is capable of mesh-like network functionality in which each group of sensor nodes is assigned a periodic guaranteed time slot for communicating in accordance with one embodiment.

FIG. 2 shows a system primarily having a tree network architecture that is capable of mesh-like network functionality in which each group of sensor nodes is assigned a periodic guaranteed time slot for communicating in accordance with one embodiment. The system 250 may establish a mesh-like network architecture for determining locations sensor nodes based on a threshold criteria (e.g., movement of at least one node by a certain distance, a change in path length between a node and the hub by a certain distance) being triggered. The system 250 includes a hub 210, a first group 295 of nodes 220, 224, 228, 230, 232 and a second group 296 of nodes 270, 280, and 290. The sensor nodes can be assigned into different groups. In another example, the group 296 is split into a first subgroup of nodes 220 and 224 and a second subgroup of nodes 228, 230, and 232. In one example, each group (or subgroup) is assigned a different periodic guaranteed time slot for communicating with other nodes or hubs.

The hub 210 includes the wireless device 211, the sensor node 220 includes the wireless device 221, the sensor node 224 includes the wireless device 225, the sensor node 228 includes the wireless device 229, the sensor node 230 includes the wireless device 231, the sensor node 232 includes the wireless device 233, the sensor node 270 includes the wireless device 271, the sensor node 280 includes the wireless device 281, and the sensor node 290 includes the wireless device 291. Additional hubs that are not shown can communicate with the hub 210 or other hubs. The hub 210 communicates bi-directionally with the sensor nodes.

These communications include bi-directional communications 240-244, 272, 282, and 292 in the wireless asymmetric network architecture. The sensor nodes communicate bi-directionally with each other based on communications 261-266, 273, and 283 to provide the mesh-like functionality for different applications including determining locations of the hub and sensor nodes.

In one embodiment, the control device 211 of the hub 210 is configured to execute instructions to determine or negotiate a timing of a periodic guaranteed time slot for each group of sensor nodes one time using a single timeslot definition signal. The hub is also configured to determine a first scheduled timing of causing the transmitter to be operable to transmit and causing the receiver to be operable to receive for each wireless device based on a periodic beacon signal of the hub to reduce power consumption of the wireless devices of the plurality of nodes. The hub provides anti-collision features by determining a different second scheduled timing of causing the transmitter to be operable to transmit and causing the receiver to be operable to receive for at least two wireless devices of the plurality of nodes if a collision is detected.

Figure 3:
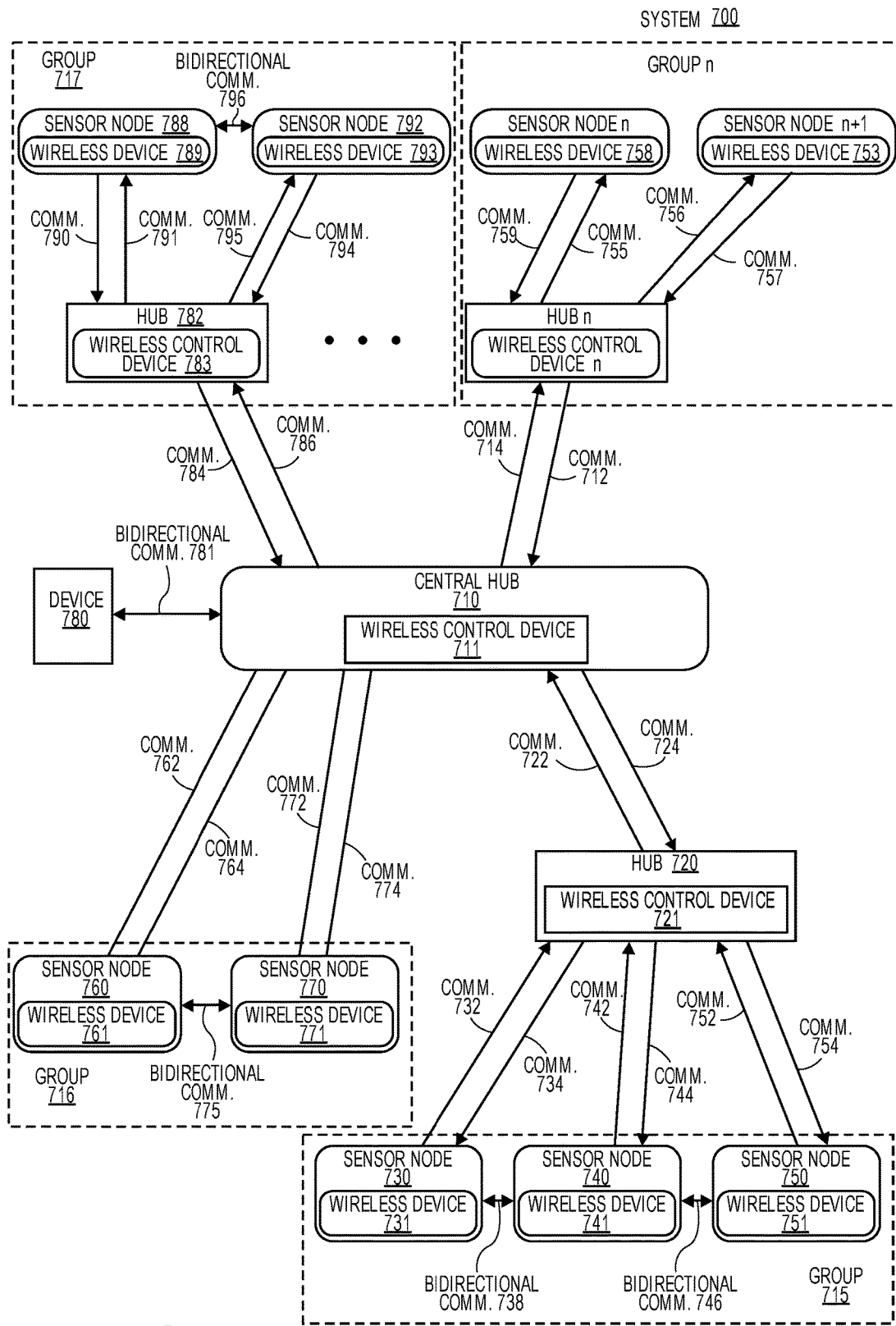
FIG. 3 shows a system with an asymmetric tree and mesh network architecture having multiple hubs in which each group of sensor nodes is assigned a periodic guaranteed time slot for communicating in accordance with one embodiment.

FIG. 3 shows a system with an asymmetric tree and mesh network architecture having multiple hubs in which each group of sensor nodes is assigned a periodic guaranteed time slot for communicating in accordance with one embodiment.

The system 700 includes a central hub 710 having a wireless control device 711, hub 720 having a wireless control device 721, hub 782 having a wireless control device 783, and additional hubs including hub n having a wireless control device n. Additional hubs which are not shown can communicate with the central hub 710, other hubs, or can be an additional central hub. Each hub communicates bi-directionally with other hubs and one or more sensor nodes. The hubs are also designed to communicate bi-directionally with other devices including device 780 (e.g., client device, mobile device, tablet device, computing device, smart appliance, smart TV, etc.).

The sensor nodes 730, 740, 750, 760, 770, 788, 792, n, and n+1 (or terminal nodes) each include a wireless device 731, 741, 751, 761, 771, 789, 793, 758, and 753, respectively. A sensor node is a terminal node if it only has upstream communications with a higher level hub or node and no downstream communications with another hub or node. Each wireless device includes RF circuitry with a transmitter and a receiver (or transceiver) to enable bi-directional communications with hubs or other sensor nodes.

In one embodiment, the central hub 710 communicates with hubs 720, 782, hub n, device 780, and nodes 760 and 770. These communications include communications 722, 724, 774, 772, 764, 762, 781, 784, 786, 714, and 712 in the wireless asymmetric network architecture. The central hub having the wireless control device 711 is configured to send communications to other hubs and to receive communications from the other hubs for controlling and monitoring the wireless asymmetric network architecture including assigning groups of nodes and a guaranteed time signal for each group.

The hub 720 communicates with central hub 710 and also sensors nodes 730, 740, and 750. The communications with these sensor nodes include communications 732, 734, 742, 744, 752, and 754. For example, from the perspective of the hub 720, the communication 732 is received by the hub and the communication 734 is transmitted to the sensor node. From the perspective of the sensor node 730, the communication 732 is transmitted to the hub 720 and the communication 734 is received from the hub.

In one embodiment, a central hub (or other hubs) assign nodes 760 and 770 to a group 716, nodes 730, 740, and 750 to a group 715, nodes 788 and 792 to a group 717, and nodes n and n+1 to a group n. In another example, groups 716 and 715 are combined into a single group.

At least one of the central hub 710 and hub 720 is configured to execute instructions to negotiate a timing of a periodic guaranteed time slot for each group of sensor nodes once using a single timeslot definition signal.

In one embodiment, a system for providing a wireless asymmetric network comprises a first hub (e.g., central hub 710) having a wireless control device 711 that is configured to control communications and power consumption in the wireless asymmetric network architecture and a first plurality of nodes (e.g., 760, 770, 788, 792, n, n+1, etc.) each having a wireless device with a transmitter and a receiver to enable bi-directional communications with the wireless control device of the first hub in the wireless asymmetric network architecture. The wireless control device is configured to determine a first scheduled timing of causing the transmitter to be operable to transmit and causing the receiver to be operable to receive for each wireless device based on a periodic beacon signal of the first hub to reduce power consumption of the wireless devices of the first plurality of nodes.

In one example, the first hub is powered by a mains electrical source and the first plurality of nodes are each powered by a battery source to form the wireless asymmetric network. An asymmetry of available power for the first hub and the first plurality of sensor nodes is exploited to enhance battery life and communication range in the wireless asymmetric network of the first plurality of sensor nodes based on low-duty cycle networking to reduce transmission-related energy consumption of the first plurality of sensor nodes.

In another example, the first scheduled timing of causing the transmitter to be operable to transmit and causing the receiver to be operable to receive for each wireless device of the first plurality of nodes is determined based on a timing relationship between the periodic beacon signal and communications of the first plurality of nodes.

In one example, the first hub provides anti-collision features by determining a different second scheduled timing of causing the transmitter to be operable to transmit and causing the receiver to be operable to receive for at least two wireless devices of the first plurality of nodes upon detection of a collision or detection of a new sensor node. The first hub transmits the periodic beacon signal initially with the first scheduled timing and subsequently with a second scheduled timing upon detection of a collision or detection of a new node.

In one example, determining the second scheduled timing comprises determining of at least one unintelligible communication based on receiving at least a portion of a communication that is unintelligible and then determining a likelihood of the at least one unintelligible communication being caused by a collision of communications transmitted at approximately the same time from different nodes.

In another embodiment, a second hub (e.g., hub 720) includes a wireless control device that is configured to control communications and power consumption in the wireless asymmetric network architecture. A second plurality of nodes (e.g., 730, 740, 750) each having a wireless device with a transmitter and a receiver to enable bi-directional communications with the wireless control device of the second hub in the wireless asymmetric network architecture. The wireless control device of the second hub is configured to determine a third scheduled timing of causing the transmitter to be operable to transmit and causing the receiver to be operable to receive for each wireless device of the second plurality of nodes to reduce power consumption of the wireless devices of the second plurality of nodes.

In one example, the second hub having the wireless control device is configured to send communications to the first hub and to receive communications from the first hub for controlling and monitoring the wireless asymmetric network architecture.

By using the architectures illustrated in FIGS. 1-3, nodes requiring long battery life minimize the energy expended on communication and higher level nodes in the tree hierarchy are implemented using available energy sources or may alternatively use batteries offering higher capacities or delivering shorter battery life. To facilitate achievement of long battery life on the battery-operated terminal nodes, communication between those nodes and their upper level counterparts (hereafter referred to as lowest-level hubs) may be established such that minimal transmit and receive traffic occurs between the lowest-level hubs and the terminal nodes.

In one embodiment, the nodes spend most of their time (e.g., more than 90% of their time, more than 95% of their time, approximately 98% or more than 99% of their time) in a low-energy non-communicative state. When the node wakes up and enters a communicative state, the nodes are operable to transmit data to the lowest-level hubs. This data may include node identification information, sensor data, node status information, synchronization information, localization information and other such information for the wireless sensor network.

FIG. 4 illustrates a time line having a repeating timeslot definition signal for defining a timeslot for wireless nodes in a wireless network in accordance with a conventional approach. A broadcast beacon signal 402-411 is periodically repeated on a time line 450 for a conventional approach (e.g., IEEE 802.15.4). A timeslot definition signal 412-416 is periodically repeated to define timeslots 420-428. The timeslot definition signal 412 defines timeslots 420 and 421, the timeslot definition signal 413 defines timeslots 422 and 423, timeslot definition signal 414 defines timeslots 425 and 426, timeslot definition signal 415 defines timeslots 426 and 427, and timeslot definition signal 416 defines timeslot 428. A receiver of a node is operable and powered ON for the broadcast beacon signals, timeslot definition signals, and certain timeslots as indicated in FIG. 4.

FIG. 5 illustrates a time line having a non-repeating timeslot definition signal for defining timeslots for wireless nodes in a wireless network architecture in accordance with one embodiment. In this embodiment, a broadcast beacon signal 552-556 is periodically repeated on a time line 550. A timeslot definition signal 560 is defined once (non-repeating) to define timeslots 571, 573, 575, 577 and 579. The timeslot definition signal 560 can define a different time slot for each group or constellation of sensor nodes in a wireless network architecture. In one embodiment, this may be accomplished by specifying start and stop times for each time slot associated with each group or constellation, or by providing start times and durations for the same, or by other such specification methods as would be apparent to one of skill in the art. A receiver of at least one node is operable during time periods 581 and 583-587 for the broadcast beacon signal 552, timeslot definition signal 560, and certain timeslots 571, 573, 575, 577, and 579 as indicated in FIG. 5. In some of the receiver powered on times (e.g., 583-587), the receiver may run in a lower power detection mode to reduce overall receiver energy consumption. The receiver operates in the lower power detection mode during the time periods 583-587, which are labeled as sensor receiver low energy detection on in FIG. 5. In this mode, the full RF reception circuitry isn't operative to receive data; rather, the receiver is configured to detect specific incoming signals without operating the entirety of the receiver circuitry, thus reducing energy consumption.

In one embodiment, sensor nodes consume significantly less power as illustrated in FIG. 5 in comparison to power consumption of nodes as illustrated in FIG. 4 at least partially due to having a receiver of the sensor nodes operable for a shorter time period. The non-repeating timeslot definition signal 560 also saves time and reduces network congestion and bandwidth requirements in comparison to the conventional approach of FIG. 4 which requires the timeslot definition signal to be repeated frequently. The timeslot definition signals 412-416 are repeated frequently and will become impractically longer for a larger number of timeslots.

In one embodiment, a system includes a hub having one or more processing units and RF circuitry for transmitting and receiving communications in a wireless network architecture and a plurality of sensor nodes each having a wireless device with a transmitter and a receiver to enable bi-directional communications with the hub in the wireless network architecture. The one or more processing units of the hub are configured to execute instructions to determine or negotiate a timing of at least one periodic guaranteed time slot for the plurality of sensor nodes once using a single timeslot definition signal. The hub is also configured to determine a first scheduled timing of causing the transmitter to be operable to transmit and causing the receiver to be operable to receive for each wireless device based on a periodic beacon signal (e.g., 552-556) of the hub to reduce power consumption of the wireless devices of the plurality of nodes. The hub provides anti-collision features by determining a different second scheduled timing of causing the transmitter to be operable to transmit and causing the receiver to be operable to receive for at least two wireless devices of the plurality of nodes if a collision or a new node is detected.

In one example, the plurality of sensor nodes includes a first group of sensor nodes and a second group of sensor nodes. A receiver of at least one of the first group of sensor nodes is configured to be operable during a first periodic guaranteed time slot and a receiver of at least one of the second group of sensor nodes is configured to be operable during a second periodic guaranteed time slot.

In one example, a transmitter of at least one of the first group of sensor nodes is configured to be operable during the first periodic guaranteed time slot and a transmitter of at least one of the second group of sensor nodes is configured to be operable during the second periodic guaranteed time slot.

In one example, the one or more processing units of the hub are configured to execute instructions to receive a transmission during the periodic guaranteed time slots and to determine whether the first group of sensor nodes or the second group of sensor nodes sent the transmission based on a timing of the transmission with respect to the particular guaranteed time slot.

In one example, at least one sensor node is configured to execute instructions to receive a transmission during a particular guaranteed time slot and to determine whether the first group of sensor nodes sent the transmission based on at least a timing of the transmission with respect to the periodic guaranteed time slots without turning on the entire receiver on the sensor node In another example, the at least one sensor node is configured to execute instructions to detect at least one of energy of the transmission and a preamble of the transmission to acknowledge the transmission without consuming power to process data of the transmission.

In one example, the one or more processing units of the hub are configured to execute instructions to broadcast at least one communication to at least one other wireless system with the at least one communication including timeslot definition for the at least one other wireless system and the definition to reserve the location of the periodic time slot for the plurality of sensor nodes within the at least one other system.

Figure 6:
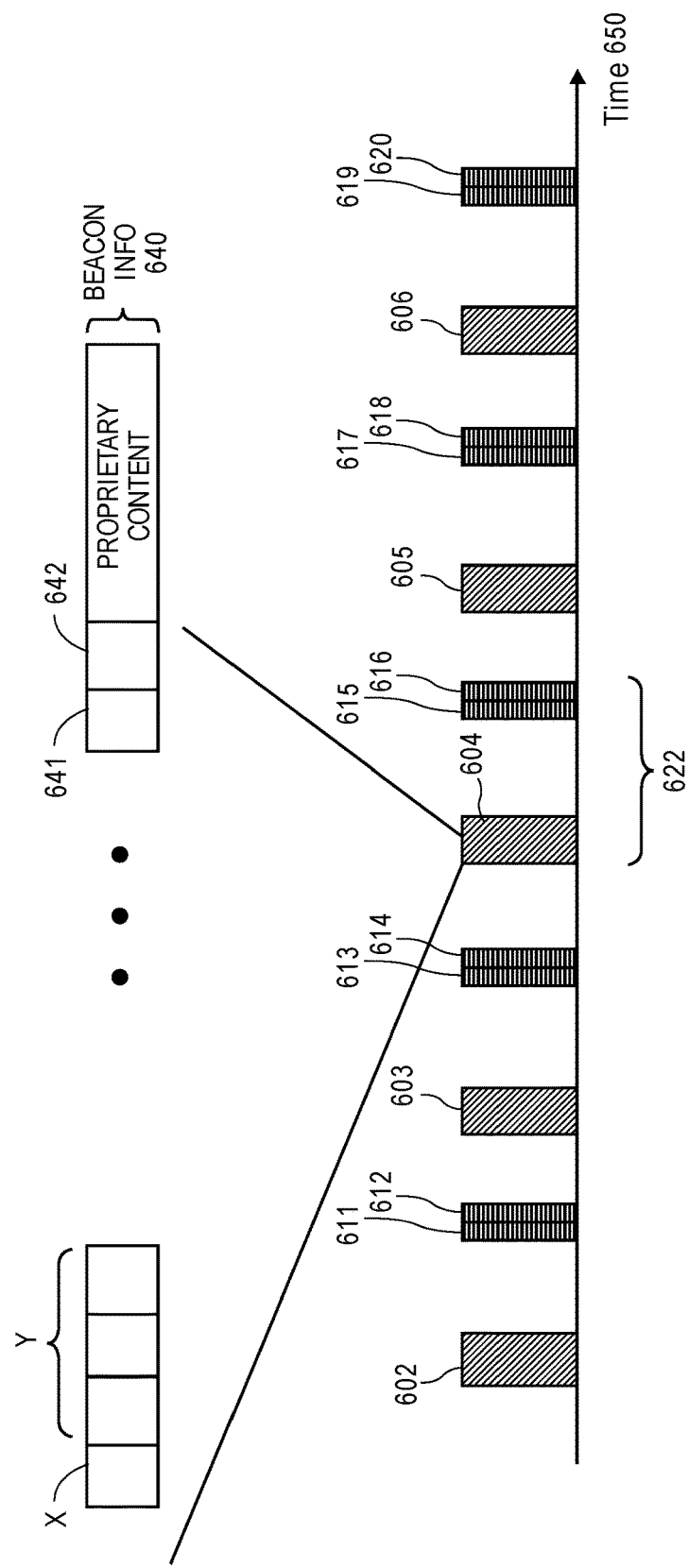
FIG. 6 illustrates a time line having a non-repeating timeslot definition signal for defining timeslots for wireless nodes in a wireless network architecture in accordance with one embodiment.

FIG. 6 illustrates a time line having a non-repeating timeslot definition signal for defining timeslots for wireless nodes in a wireless network architecture in accordance with one embodiment. A broadcast beacon signal 602-606 is periodically repeated on a time line 650. The broadcast beacon signal may include 1 byte field x indicating to other systems that this is a beacon frame followed by field y that can include information where the frame related information 641 and 642 can be found inside the beacon info 640. Frames like 622 are time slots where hub and nodes can communicate without other systems interfering. During the frames, data, acknowledgment, beacon, or MAC command packets can be sent. The frames may include scheduled timing information (e.g., initial scheduled timing information, subsequent scheduled timing information upon detection of a new node or detection of a collision) for causing the transmitter to be operable to transmit and causing the receiver to be operable to receive for each wireless device of a sensor node.

Defining the frames using a known protocol in the beginning of the beacon before a proprietary content prevents other system from transmitting during the time periods of the guaranteed time slots. In one example, no other system (e.g., IEEE 802.15.4 systems) will transmit during a time period 622 (or other similar periodic time periods) based on including the frame information 641 and 642 at the beginning of every beacon. The frame order field 642 includes information about the length of the frame and the beacon order field 641 includes the information about the time between two frames.

Figure 7:
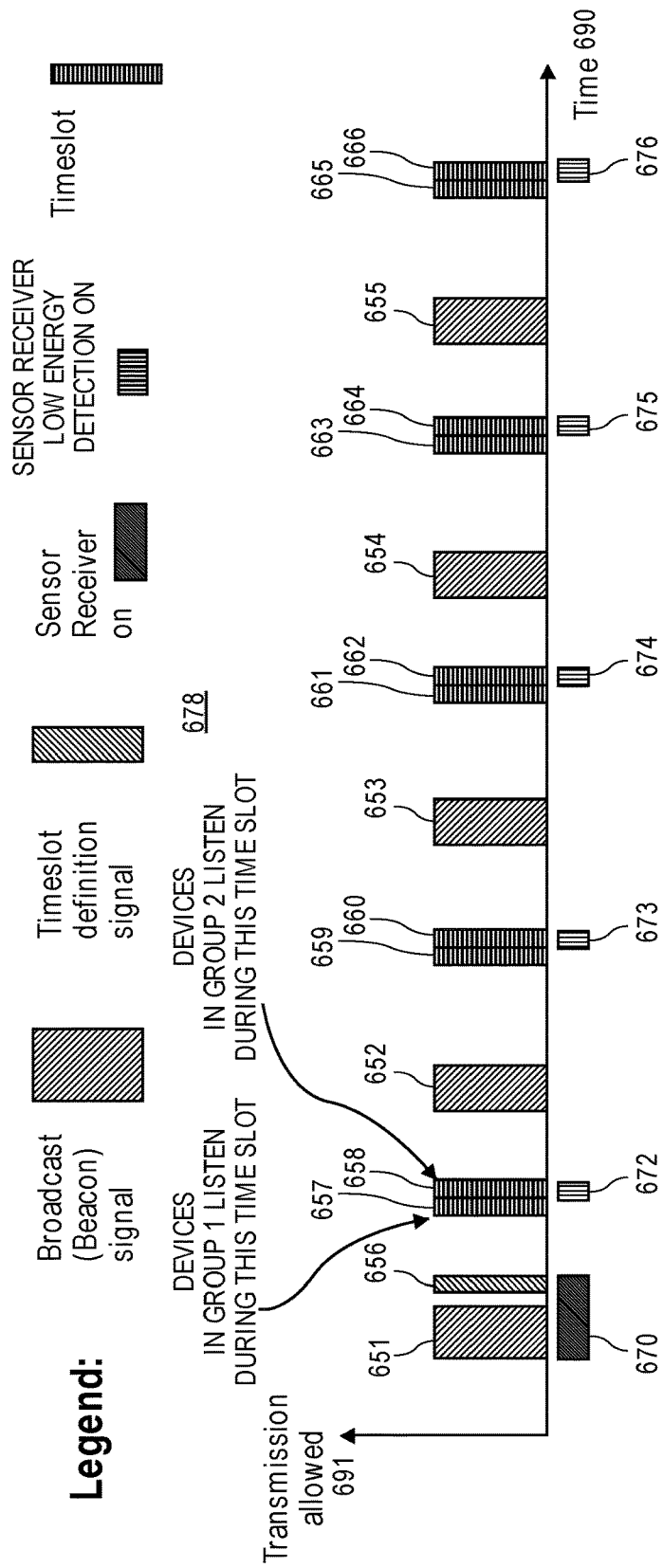
FIG. 7 illustrates a diagram 678 having a non-repeating timeslot definition signal for defining timeslots for multiple groups of wireless nodes in a wireless network architecture in accordance with one embodiment.

FIG. 7 illustrates a diagram 678 having a non-repeating timeslot definition signal for defining timeslots for multiple groups of wireless nodes in a wireless network architecture in accordance with one embodiment. The diagram 678 illustrates a vertical axis (transmission allowed 691) versus a horizontal axis (time line 690) for communications in a wireless sensor network. A broadcast beacon signal 661-655 is periodically repeated (e.g., 50 milliseconds, 100 milliseconds, 200 milliseconds, etc.) on a horizontal axis (time line 690). The broadcast beacon signal may include address information (e.g., optional MAC address info which defines a unique identifier assigned to a network interface (e.g., hub) for communications on a physical network segment) and also information about frames as discussed in conjunction with the description of FIG. 6.

A timeslot definition signal 656 is defined once (non-repeating) to define timeslots 658, 660, 662, 664 and 666. The timeslot definition signal 656 can define a different time slot for each group or constellation of sensor nodes in a wireless network architecture. In one example, devices (e.g., sensor nodes) in a first group have operable receivers for receiving communications during timeslot signals 657, 659, 661, 663, and 665. Devices (e.g., sensor nodes) in a second group have operable receivers for receiving communications during timeslot signals 658, 660, 662, 664, and 666.

A receiver of at least one node of the second group is operable during time periods 670 and 672-676 for the broadcast beacon signal 651, timeslot definition signal 656, and certain timeslots 658, 660, 662, 664, and 666 as indicated in FIG. 7. Defining guaranteed time slots prevents other groups from transmitting during the time periods of the guaranteed time slots.

Figure 8:
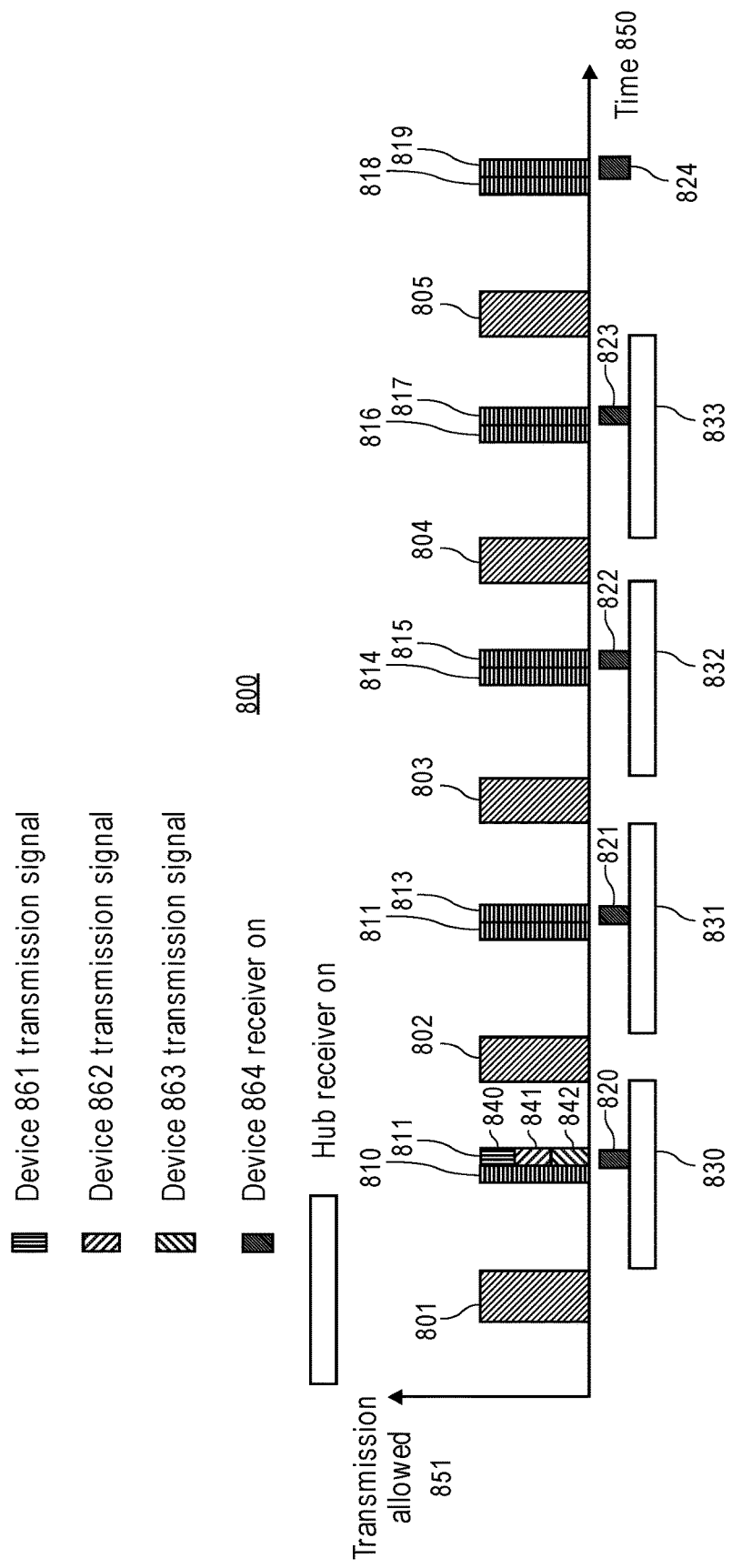
FIG. 8 illustrates a diagram 800 having communications being transmitted by a hub and groups of wireless nodes in a wireless network architecture in accordance with one embodiment.

FIG. 8 illustrates a diagram 800 having communications being transmitted by a hub and groups of wireless nodes in a wireless network architecture in accordance with one embodiment. The diagram 800 illustrates a vertical axis (transmission allowed 851) versus a horizontal axis (time line 850) for communications in a wireless sensor network. A broadcast beacon signal 801-805 is periodically repeated (e.g., 50 milliseconds, 100 milliseconds, 200 milliseconds, etc.) on a time line 850. The broadcast beacon signal may include address information (e.g., optional MAC address info which defines a unique identifier assigned to a network interface (e.g., hub) for communications on a physical network segment) and also information about frames as discussed in conjunction with the description of FIG. 6.

A timeslot definition signal (e.g., timeslot definition signal 656) has been previously defined once (non-repeating) to define timeslots 811, 813, 815, 817 and 819. The timeslot definition signal can define a different time slot for each group or constellation of sensor nodes in a wireless network architecture. In one example, devices (e.g., sensor nodes) in a first group have operable receivers for receiving communications during timeslot signals 810, 812, 814, 816, and 818. Devices (e.g., sensor nodes) in a second group have operable receivers for receiving communications during timeslot signals 811, 813, 815, 817, and 819.

A receiver of at least one node of the second group is operable during time periods 820-824 for certain timeslots 811, 813, 815, 817, and 819 as indicated in FIG. 8. Defining guaranteed time slots prevents other groups from transmitting during the time periods of the guaranteed time slots. A receiver of a hub is operational during time periods 830-833 for receiving communications from sensors nodes in the wireless sensor network.

In one example, a second group of low power sensor nodes includes devices 861-864. The device 864 has an operable receiver during time periods 820-824. The device 864 receives communications from devices 861-863 during time period 820. The devices 861-863 have operable transmitters from transmitting communication signals 840, 841, and 842, respectively during a time slot 811. The device 864 upon receiving the transmitting communications from device 861-863 can then act in accordance with its programming. The device 864 may be configured to execute instructions to detect at least one of energy of the transmissions of devices 861-863 and a preamble of these transmissions. The device 864 may then acknowledge at least one of the transmissions without consuming power to process data of the transmissions. The device 864 does no decoding of actual content of the transmissions. Rather, a device having more power (e.g., hub powered by electrical mains) can also receive these transmissions from device 861-863 and decode the actual content of these transmission. The hub can recognize and identify devices 861-863 based on their individual unique orthogonal transmission codes of communication signals 840-842.

FIG. 9 illustrates a network architecture for communications between a hub and a group of devices (e.g., sensor nodes) in accordance with one embodiment. The network architecture 900 includes the hub 910 and devices 961 and 962 with bi-directional communications 920, 921, and 922 between the hub and the devices 961 and 962. In one example, the hub is powered by an electrical mains while the devices have a limited power supply (e.g., battery, solar, etc.).

FIG. 10 illustrates a diagram 1000 having communications being transmitted by a hub and groups of wireless nodes in a wireless network architecture in accordance with one embodiment. The diagram 1000 illustrates a vertical axis (transmit power 1051) versus a horizontal axis (time line 1050) for communications in a wireless sensor network. A broadcast beacon signal 1001-1005 is periodically repeated (e.g., 50 milliseconds, 100 milliseconds, 200 milliseconds, etc.) on a time line 1050. The broadcast beacon signal may include address information (e.g., optional MAC address info which defines a unique identifier assigned to a network interface (e.g., hub) for communications on a physical network segment) and also information about frames as discussed in conjunction with the description of FIG. 6. A timeslot definition signal (e.g., timeslot definition signal 656) has been previously defined once (non-repeating) to define timeslots that correspond to time periods 1020-1023 for a group of sensor nodes having operational receivers. In one example, devices (e.g., sensor nodes) in a first group have operable receivers for receiving communications during timeslot signals. A hub has a receiver that is operable for receiving communications during time periods 1030-1033. A hub 910 is transmitting at 1006 and 1007. A device 961 is transmitting at 1010 and 1011.

In one example, the signals transmitted by device 961 at 1010 and 1011 are not received by the device 962. The signals may be weak and only detected by the hub 910. The hub 910 can transmit an acknowledgement of the signals transmitted by device 961. The device 962 will receive this acknowledgement during its assigned time slot and act according to its programming. The device 961 may then stop transmitting upon receiving the acknowledgement 1007 from the hub 910. The hub can extend a range of the wireless sensor network by repeating weak signals from a first node to a second node that is not able to receive communications directly from the first node.

In one example, a sensor detects a triggering event that causes the sensor to generate and transmit an alarm signal during a next guaranteed time slot or possibly prior to the next guaranteed time slot. The hub receives the alarm signal and determines an action (e.g., repeating the alarm signal which causes all nodes to wake, causing an alarm signal to be sent to a home owner, police station, fire station, ambulance, etc.) based on receiving the alarm signal. Upon waking other sensor nodes, the hub may receive additional communications from other sensors. The hub can then determine an appropriate action based on the additional communications. For example, all sensors after receiving a wake signal from the hub may capture images and transmit the images to the hub for analysis.

In one embodiment, an apparatus (e.g., hub) for providing a wireless asymmetric network architecture comprises a memory for storing instructions, one or more processing units to execute instructions to establish and control communications in a wireless asymmetric network, and radio frequency (RF) circuitry to transmit and receive communications in the wireless asymmetric network. The RF circuitry transmits communications to a plurality of nodes each having a wireless device with a transmitter and a receiver to enable bi-directional communications with the RF circuitry of the apparatus in the wireless asymmetric network. The one or more processing units are configured to execute instructions to determine a first scheduled timing of causing the transmitter to be operable to transmit and causing the receiver to be operable to receive for each wireless device based on a periodic beacon signal (e.g., 552-556, 602-606, 651-655, 801-805, 1001-1005, etc.) of the apparatus to reduce power consumption of the wireless devices of the plurality of nodes.

In another example, the apparatus is powered by a mains electrical source and the plurality of nodes are each powered by a battery source or another energy source to form the wireless asymmetric network. An asymmetry of available power for the apparatus and the first plurality of sensor nodes is exploited to enhance battery life and communication range in the wireless asymmetric network of the first plurality of sensor nodes based on low-duty cycle networking to reduce transmission-related energy consumption of the first plurality of sensor nodes.

In one example, the first scheduled timing of causing the transmitter to be operable to transmit and causing the receiver to be operable to receive for each wireless device of the first plurality of nodes is determined based on a timing relationship between the periodic beacon signal and communications of the plurality of nodes.

In one example, the apparatus provides anti-collision features by determining a different second scheduled timing of causing the transmitter to be operable to transmit and causing the receiver to be operable to receive for at least two wireless devices of the plurality of nodes upon detection of a collision or detection of a new node. The apparatus transmits the periodic beacon signal initially with the first scheduled timing and subsequently with the second scheduled timing upon detection of a collision or detection of a new node.

In one example, determining the second scheduled timing comprises determining of at least one unintelligible communication based on receiving at least a portion of a communication that is unintelligible and then determining a likelihood of the at least one unintelligible communication being caused by a collision of communications transmitted at approximately the same time from different nodes.

The communication between hubs and nodes as discussed herein may be achieved using a variety of means, including but not limited to direct wireless communication using radio frequencies, Powerline communication achieved by modulating signals onto the electrical wiring within the house, apartment, commercial building, etc., WiFi communication using such standard WiFi communication protocols as 802.11a, 802.11b, 802.11n, 802.11ac, and other such Wifi Communication protocols as would be apparent to one of ordinary skill in the art, cellular communication such as GPRS, EDGE, 3G, HSPDA, LTE, and other cellular communication protocols as would be apparent to one of ordinary skill in the art, Bluetooth communication, communication using well-known wireless sensor network protocols such as Zigbee, and other wire-based or wireless communication schemes as would be apparent to one of ordinary skill in the art.

The implementation of the radio-frequency communication between the terminal nodes and the hubs may be implemented in a variety of ways including narrow-band, channel overlapping, channel stepping, multi-channel wide band, and ultra-wide band communications.

The hubs may be physically implemented in numerous ways in accordance with embodiments of the invention. FIG. 11A shows an exemplary embodiment of a hub implemented as an overlay 1500 for an electrical power outlet in accordance with one embodiment. The overlay 1500 (e.g., faceplate) includes a hub 1510 and a connection 1512 (e.g., communication link, signal line, electrical connection, etc.) that couples the hub to the electrical outlet 1502. Alternatively (or additionally), the hub is coupled to outlet 1504. The overlay 1500 covers or encloses the electrical outlets 1502 and 1504 for safety and aesthetic purposes.

FIG. 11B shows an exemplary embodiment of an exploded view of a block diagram of a hub 1520 implemented as an overlay for an electrical power outlet in accordance with one embodiment. The hub 1520 includes a power supply rectifier 1530 that converts alternating current (AC), which periodically reverses direction, to direct current (DC) which flows in only one direction. The power supply rectifier 1530 receives AC from the outlet 1502 via connection 1512 (e.g., communication link, signal line, electrical connection, etc.) and converts the AC into DC for supplying power to a controller circuit 1540 via a connection 1532 (e.g., communication link, signal line, electrical connection, etc.) and for supplying power to RF circuitry 1550 via a connection 1534 (e.g., communication link, signal line, electrical connection, etc.). The controller circuit 1540 includes memory 1542 or is coupled to memory that stores instructions which are executed by processing logic 1544 (e.g., one or more processing units) of the controller circuit 1540 for controlling operations of the hub for forming, monitoring, and performing localization of the wireless asymmetrical network as discussed herein. The RF circuitry 1550 may include a transceiver or separate transmitter 1554 and receiver 1556 functionality for sending and receiving bi-directional communications via antenna(s) 1552 with the wireless sensor nodes. The RF circuitry 1550 communicates bi-directionally with the controller circuit 1540 via a connection 1534 (e.g., communication link, signal line, electrical connection, etc.). The hub 1520 can be a wireless control device 1520 or the controller circuit 1540, RF circuitry 1550, and antenna(s) 1552 in combination may form the wireless control device as discussed herein.

Figure 12B:
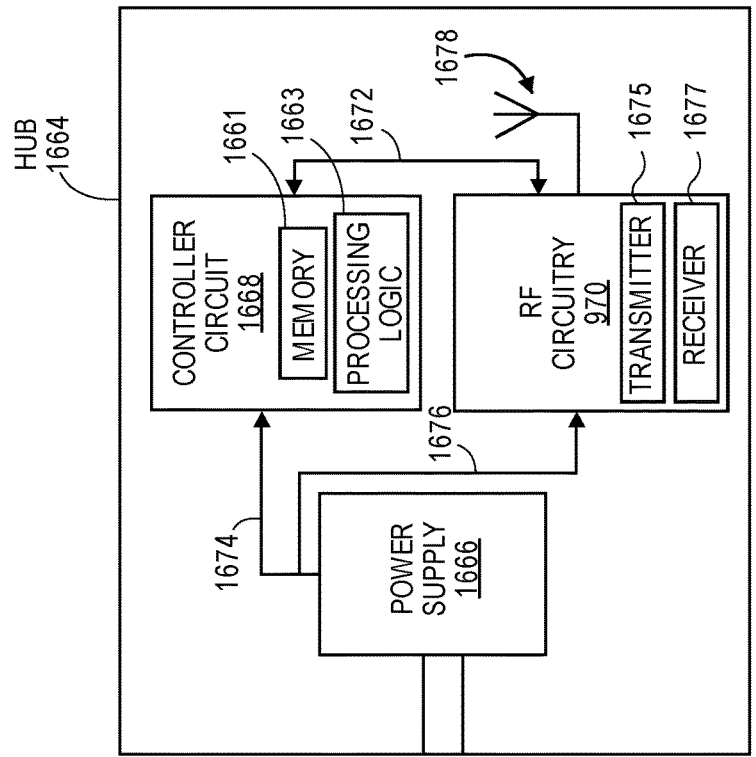
FIG. 12B shows an exemplary embodiment of a block diagram of a hub 1664 implemented as a card for deployment in a computer system, appliance, or communication hub in accordance with one embodiment.
Figure 12A:
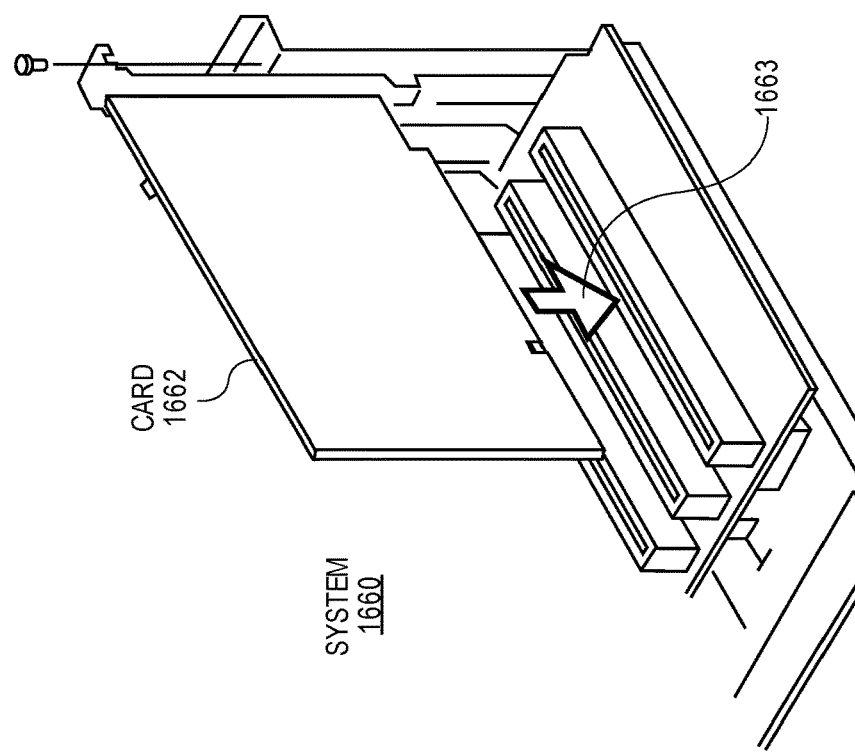
FIG. 12A shows an exemplary embodiment of a hub implemented as a card for deployment in a computer system, appliance, or communication hub in accordance with one embodiment.

FIG. 12A shows an exemplary embodiment of a hub implemented as a card for deployment in a computer system, appliance, or communication hub in accordance with one embodiment. The card 1662 can be inserted into the system 1660 (e.g., computer system, appliance, or communication hub) as indicated by arrow 1663.

FIG. 12B shows an exemplary embodiment of a block diagram of a hub 1664 implemented as a card for deployment in a computer system, appliance, or communication hub in accordance with one embodiment. The hub 1664 includes a power supply 1666 that provides power (e.g., DC power supply) to a controller circuit 1668 via a connection 1674 (e.g., communication link, signal line, electrical connection, etc.) and provides power to RF circuitry 1670 via a connection 1676 (e.g., communication link, signal line, electrical connection, etc.). The controller circuit 1668 includes memory 1661 or is coupled to memory that stores instructions which are executed by processing logic 1663 (e.g., one or more processing units) of the controller circuit 1668 for controlling operations of the hub for forming, monitoring, and communicating within the wireless asymmetrical network as discussed herein. The RF circuitry 1670 may include a transceiver or separate transmitter 1675 and receiver 1677 functionality for sending and receiving bi-directional communications via antenna(s) 1678 with the wireless sensor nodes. The RF circuitry 1670 communicates bi-directionally with the controller circuit 1668 via a connection 1672 (e.g., communication link, signal line, electrical connection, etc.). The hub 1664 can be a wireless control device 1664 or the controller circuit 1668, RF circuitry 1670, and antenna(s) 1678 in combination may form the wireless control device as discussed herein.

FIG. 12C shows an exemplary embodiment of a hub implemented within an appliance (e.g., smart washing machine, smart refrigerator, smart thermostat, other smart appliances, etc.) in accordance with one embodiment. The appliance 1680 (e.g., smart washing machine) includes a hub 1682.

FIG. 12D shows an exemplary embodiment of an exploded view of a block diagram of a hub 1684 implemented within an appliance (e.g., smart washing machine, smart refrigerator, smart thermostat, other smart appliances, etc.) in accordance with one embodiment. The hub includes a power supply 1686 that provides power (e.g., DC power supply) to a controller circuit 1690 via a connection 1696 (e.g., communication link, signal line, electrical connection, etc.) and provides power to RF circuitry 1692 via a connection 1698 (e.g., communication link, signal line, electrical connection, etc.). The controller circuit 1690 includes memory 1691 or is coupled to memory that stores instructions which are executed by processing logic 1688 (e.g., one or more processing units) of the controller circuit 1690 for controlling operations of the hub for forming, monitoring, and performing localization of the wireless asymmetrical network as discussed herein. The RF circuitry 1692 may include a transceiver or separate transmitter 1694 and receiver 1695 functionality for sending and receiving bi-directional communications via antenna(s) 1699 with the wireless sensor nodes. The RF circuitry 1692 communicates bi-directionally with the controller circuit 1690 via a connection 1689 (e.g., communication link, signal line, electrical connection, etc.). The hub 1684 can be a wireless control device 1684 or the controller circuit 1690, RF circuitry 1692, and antenna(s) 1699 in combination may form the wireless control device as discussed herein.

In one embodiment, an apparatus (e.g., hub) for providing a wireless asymmetric network architecture includes a memory for storing instructions, processing logic (e.g., one or more processing units, processing logic 1544, processing logic 1663, processing logic 1688, processing logic 1763, processing logic 1888) of the hub to execute instructions to establish and control communications in a wireless asymmetric network architecture, and radio frequency (RF) circuitry (e.g., RF circuitry 1550, RF circuitry 1670, RF circuity 1692, RF circuitry 1890) including multiple antennas (e.g., antenna(s) 1552, antenna(s) 1678, antenna(s) 1699, antennas 1311, 1312, and 1313, etc.) to transmit and receive communications in the wireless asymmetric network architecture. The RF circuitry and multiple antennas to transmit communications to a plurality of sensor nodes (e.g., node 1, node 2) each having a wireless device with a transmitter and a receiver (or transmitter and receiver functionality of a transceiver) to enable bi-directional communications with the RF circuitry of the apparatus in the wireless asymmetric network architecture. The processing logic (e.g., one or more processing units) is configured to execute instructions to determine or negotiate a timing of at least one periodic guaranteed time slot for the plurality of sensor nodes once using a non-repeating timeslot definition signal.

In one example, the plurality of sensor nodes includes a first group of sensor nodes and a second group of sensor nodes. A transmitter of at least one of the first group of sensor nodes is configured to be operable during a first periodic guaranteed time slot and a transmitter of at least one of the second group of sensor nodes is configured to be operable during a second periodic guaranteed time slot.

In one example, the one or more processing units of the hub are configured to execute instructions to receive a transmission during the at least one periodic guaranteed time slot and to determine whether the first group of sensor nodes or the second group of sensor nodes sent the transmission based on a timing of the transmission with respect to the at least one periodic guaranteed time slot.

In one example, the one or more processing units of the hub are configured to execute instructions to periodically broadcast at least one communication to at least one other wireless system with the at least one communication including commands for the at least one other wireless system. The at least one communication may include a frame length and a periodicity for reserving a periodic time period for sending and receiving communications within the wireless network architecture.

In one example, the periodic time period includes the guaranteed time slot for the plurality of sensor nodes.

Various batteries could be used in the wireless sensor nodes, including lithium-based chemistries such as Lithium Ion, Lithium Thionyl Chloride, Lithium Manganese Oxide, Lithium Polymer, Lithium Phosphate, and other such chemistries as would be apparent to one of ordinary skill in the art. Additional chemistries that could be used include Nickel metal hydride, standard alkaline battery chemistries, Silver Zinc and Zinc Air battery chemistries, standard Carbon Zinc battery chemistries, lead Acid battery chemistries, or any other chemistry as would be obvious to one of ordinary skill in the art.

The present invention also relates to an apparatus for performing the operations described herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method operations.

Figure 13:
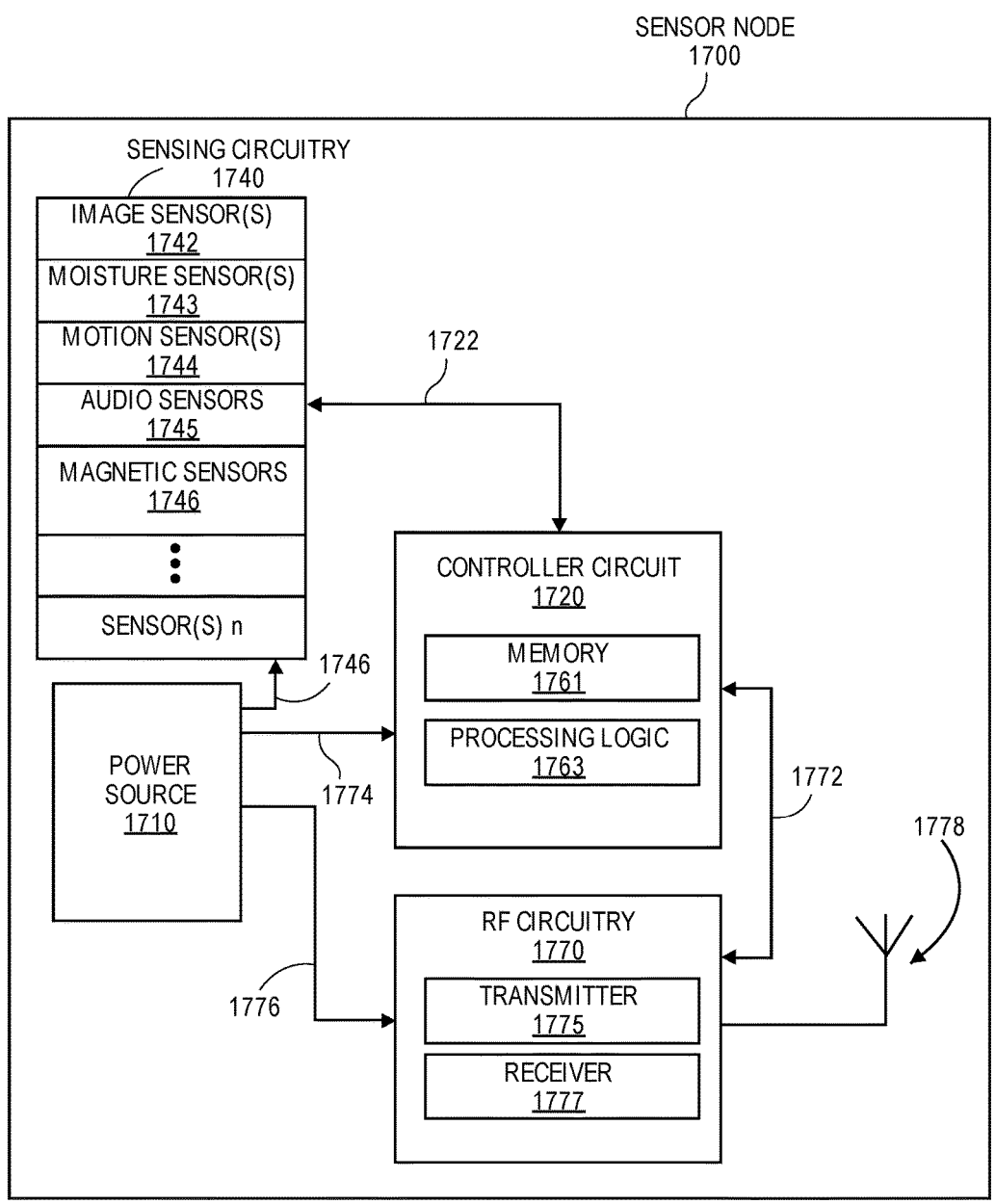
FIG. 13 illustrates a block diagram of a sensor node in accordance with one embodiment.

FIG. 13 illustrates a block diagram of a sensor node in accordance with one embodiment. The sensor node 1700 includes a power source 1710 (e.g., energy source, battery source, primary cell, rechargeable cell, etc.) that provides power (e.g., DC power supply) to a controller circuit 1720 via a connection 1774 (e.g., communication link, signal line, electrical connection, etc.), provides power to RF circuitry 1770 via a connection 1776 (e.g., communication link, signal line, electrical connection, etc.), and provides power to sensing circuitry 1740 via a connection 1746 (e.g., communication link, signal line, electrical connection, etc.). The controller circuit 1720 includes memory 1761 or is coupled to memory that stores instructions which are executed by processing logic 1763 (e.g., one or more processing units) of the controller circuit 1720 for controlling operations of the sensor node for forming and monitoring the wireless asymmetrical network as discussed herein. The RF circuitry 1770 (e.g., communication circuitry) may include a transceiver or separate transmitter 1775 and receiver 1777 functionality for sending and receiving bi-directional communications via antenna(s) 1778 with the hub(s) and optional wireless sensor nodes. The RF circuitry 1770 communicates bi-directionally with the controller circuit 1720 via a connection 1772 (e.g., electrical connection). The sensing circuitry 1740 includes various types of sensing circuitry and sensor(s) including image sensor(s) and circuitry 1742, moisture sensor(s) and circuitry 1743, temperature sensor(s) and circuitry, humidity sensor(s) and circuitry, air quality sensor(s) and circuitry, light sensor(s) and circuitry, motion sensor(s) and circuitry 1744, audio sensor(s) and circuitry 1745, magnetic sensor(s) and circuitry 1746, and sensor(s) and circuitry n, etc.

In one embodiment, a sensor node for a wireless network architecture includes at least one sensor, a memory for storing instructions, processing logic coupled to the memory and the at least one sensor. The processing logic executes instructions for processing data received from the at least one sensor and for processing communications for the sensor node. The sensor node includes radio frequency (RF) circuitry that is coupled to the processing logic. The RF circuitry includes transmitter and receiver functionality to transmit communications to a hub and to receive communications from the hub in the wireless network architecture. The processing logic is configured to execute instructions to receive communications during at least one periodic guaranteed time slot that is defined once using a single timeslot definition signal.

In one example, the sensor node is assigned to the at least one periodic guaranteed time slot. The receiver functionality of the sensor node is configured to be operable during the at least one periodic guaranteed time slot.

In one example, the receiver functionality of the sensor node is configured to be operable during the periodic guaranteed time slot. In one example, the processing logic is configured to execute instructions to receive a transmission and to determine whether a sensor node sent the transmission based on a timing of the transmission with respect to the at least one periodic guaranteed time slot without determining a data pattern having a unique code for the transmission.

In one example, the sensor node is configured to execute instructions to detect at least one of energy of the transmission and a preamble of the transmission to ascertain the transmission without consuming power to process data of the transmission.

In one example, the sensor node to operate with a battery source.

In one embodiment, a sensor node for a wireless network architecture comprises at least one sensor, a memory for storing instructions, processing logic coupled to the memory and the at least one sensor. The processing logic is configured to execute instructions for processing data received from the at least one sensor and for processing communications for the sensor node. Radio frequency (RF) circuitry is coupled to the processing logic. The RF circuitry includes transmitter and receiver functionality to transmit communications to a hub and to receive communications from the hub in the wireless network architecture. The processing logic is configured to execute instructions to receive a periodic beacon signal from the hub and to determine a first scheduled timing of causing the transmitter functionality to be operable to transmit and causing the receiver functionality to be operable to receive based on the periodic beacon signal.

In one example, the processing logic of the sensor node is configured to receive a non-repeating time slot definition signal to define time slots for the first scheduled timing.

In one example, the processing logic of the sensor node is configured to receive a different second scheduled timing of causing the transmitter functionality to be operable to transmit and causing the receiver functionality to be operable to receive.

Figure 14:
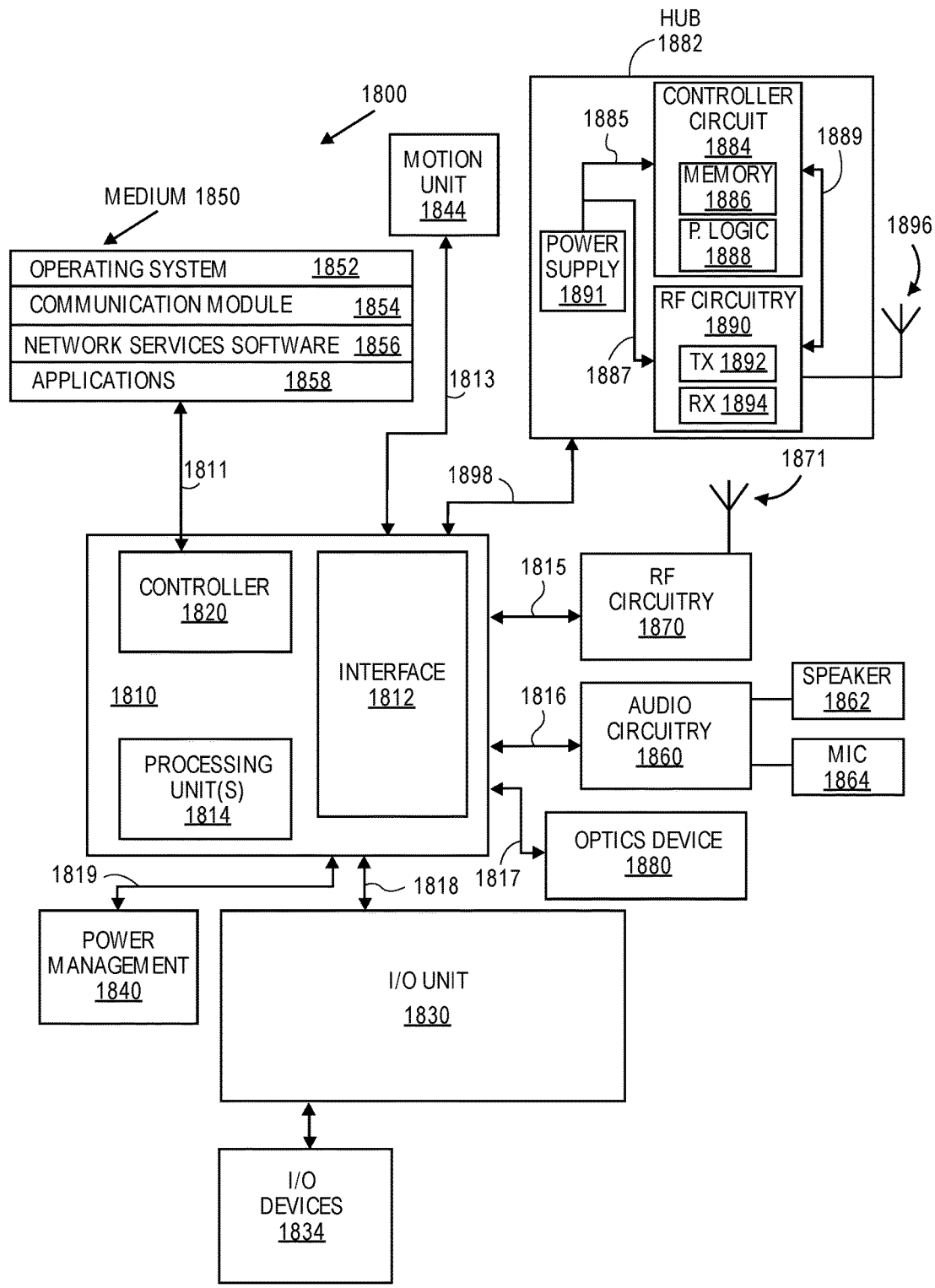
FIG. 14 illustrates a block diagram of a system or appliance 1800 having a hub in accordance with one embodiment.

FIG. 14 illustrates a block diagram of a system 1800 having a hub in accordance with one embodiment. The system 1800 includes or is integrated with a hub 1882 or central hub of a wireless asymmetric network architecture. The system 1800 (e.g., computing device, smart TV, smart appliance, communication system, etc.) may communicate with any type of wireless device (e.g., cellular phone, wireless phone, tablet, computing device, smart TV, smart appliance, etc.) for sending and receiving wireless communications. The system 1800 includes a processing system 1810 that includes a controller 1820 and processing units 1814. The processing system 1810 communicates with the hub 1882, an Input/Output (I/O) unit 1830, radio frequency (RF) circuitry 1870, audio circuitry 1860, an optics device 1880 for capturing one or more images or video, an optional motion unit 1844 (e.g., an accelerometer, gyroscope, etc.) for determining motion data (e.g., in three dimensions) for the system 1800, a power management system 1840, and machine-accessible non-transitory medium 1850 via one or more bi-directional communication links or signal lines 1898, 1818, 1815, 1816, 1817, 1813, 1819, 1811, respectively.

The hub 1882 includes a power supply 1891 that provides power (e.g., DC power supply) to a controller circuit 1884 via a connection 1885 (e.g., communication link, signal line, electrical connection, etc.) and provides power to RF circuitry 1890 via a connection 1887 (e.g., communication link, signal line, electrical connection, etc.). The controller circuit 1884 includes memory 1886 or is coupled to memory that stores instructions which are executed by processing logic 1888 (e.g., one or more processing units) of the controller circuit 1884 for controlling operations of the hub for forming and monitoring the wireless asymmetrical network as discussed herein. The RF circuitry 1890 may include a transceiver or separate transmitter (TX) 1892 and receiver (RX) 1894 functionality for sending and receiving bi-directional communications via antenna(s) 1896 with the wireless sensor nodes or other hubs. The RF circuitry 1890 communicates bi-directionally with the controller circuit 1884 via a connection 1889 (e.g., communication link, signal line, electrical connection, etc.). The hub 1882 can be a wireless control device 1884 or the controller circuit 1884, RF circuitry 1890, and antenna(s) 1896 in combination may form the wireless control device as discussed herein.

RF circuitry 1870 and antenna(s) 1871 of the system or RF circuitry 1890 and antenna(s) 1896 of the hub 1882 are used to send and receive information over a wireless link or network to one or more other wireless devices of the hubs or sensors nodes discussed herein. Audio circuitry 1860 is coupled to audio speaker 1862 and microphone 1064 and includes known circuitry for processing voice signals. One or more processing units 1814 communicate with one or more machine-accessible non-transitory mediums 1850 (e.g., computer-readable medium) via controller 1820. Medium 1850 can be any device or medium (e.g., storage device, storage medium) that can store code and/or data for use by one or more processing units 1814. Medium 1850 can include a memory hierarchy, including but not limited to cache, main memory and secondary memory.

The medium 1850 or memory 1886 stores one or more sets of instructions (or software) embodying any one or more of the methodologies or functions described herein. The software may include an operating system 1852, network services software 1856 for establishing, monitoring, and controlling wireless asymmetric network architectures, communications module 1854, and applications 1858 (e.g., home or building security applications, home or building integrity applications, developer applications, etc.). The software may also reside, completely or at least partially, within the medium 1850, memory 1886, processing logic 1888, or within the processing units 1814 during execution thereof by the device 1800. The components shown in FIG. 18 may be implemented in hardware, software, firmware or any combination thereof, including one or more signal processing and/or application specific integrated circuits.

Communication module 1854 enables communication with other devices. The I/O unit 1830 communicates with different types of input/output (I/O) devices 1834 (e.g., a display, a liquid crystal display (LCD), a plasma display, a cathode ray tube (CRT), touch display device, or touch screen for receiving user input and displaying output, an optional alphanumeric input device).

Figure 15:
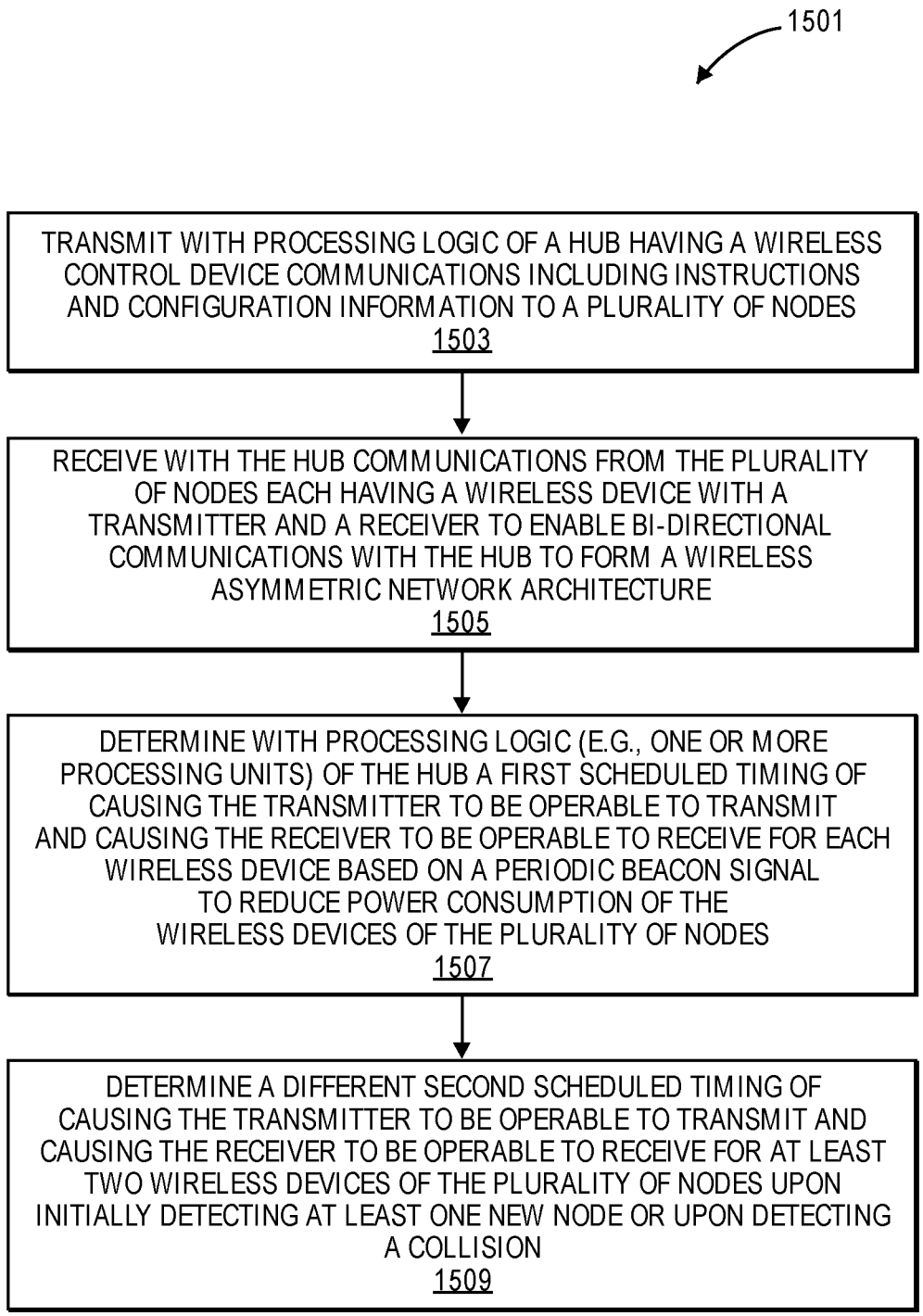
FIG. 15 illustrates a flow chart for a method of providing communications for a wireless asymmetric network architecture in accordance with one embodiment.

FIG. 15 illustrates a flow chart for a method of providing communications for a wireless asymmetric network architecture in accordance with one embodiment. The operations of method 1501 may be executed by a wireless device, a wireless control device of a hub (e.g., an apparatus), or system, which includes processing circuitry or processing logic. The processing logic may include hardware (circuitry, dedicated logic, etc.), software (such as is run on a general purpose computer system or a dedicated machine or a device), or a combination of both. In one embodiment, a hub performs the operations of method 1501.

At operation 1503, processing logic of a hub having a wireless control device transmits communications (e.g., periodic beacon signals, a non-repeating time slot definition signal, etc.) including instructions and configuration information to a plurality of nodes each having a wireless device with a transmitter and a receiver to enable bi-directional communications with the hub to form the wireless asymmetric network architecture. Other information including node identification information, timing information, and other information may also be included in the transmitted communications. In one example, RF circuitry of the hub transmits and receives communications. At operation 1505, the hub receives communications from the plurality of nodes each having a wireless device with a transmitter and a receiver (or transceiver) to enable bi-directional communications with the hub to form a wireless asymmetric network architecture. At operation 1507, processing logic (e.g., one or more processing units) of the hub determines a first scheduled timing of causing the transmitter (or transmitter functionality of a transceiver) to be operable to transmit and causing the receiver (or receiver functionality of a transceiver) to be operable to receive for each wireless device based on a periodic beacon signal and possibly received communications from the nodes to reduce power consumption of the wireless devices of the plurality of nodes. In one example, the determination of the first scheduled timing occurs prior to, during, or subsequent to transmission of a first beacon broadcast signal. An initial (or one of the initial) beacon signals or a non-repeating time slot definition signal may include the first scheduled timing.

At operation 1509, the processing logic (e.g., one or more processing units) of the hub determines a different second scheduled timing of causing the transmitter to be operable to transmit and causing the receiver to be operable to receive for at least two wireless devices of the plurality of sensor nodes upon initially detecting at least one new node, which was not included in first scheduled timing, or upon detecting a collision. For example, receiving at least one unintelligible communication during the first scheduled timing from at least one wireless device of the plurality of sensor nodes may cause detection of a collision.

In one example, the hub transmits at least one of the periodic beacon signal initially and the time slot definition signal with the first scheduled timing and subsequently the beacon signal includes the second scheduled timing upon detection of a collision or detection of a new node.

In one example, the first scheduled timing of causing the transmitter to be operable to transmit and causing the receiver to be operable to receive for each wireless device of the plurality of nodes is determined based on a timing relationship between the periodic beacon signal and communications of the plurality of nodes.

In one example, the hub is powered by a mains electrical source and the plurality of nodes are each powered by a battery source or another energy source to form the wireless asymmetric network architecture.

In one embodiment, the scheduled timing of causing the transmitter (or transmitter functionality of a transceiver) to be operable to transmit and causing the receiver (or receiver functionality of a transceiver) to be operable to receive for each wireless device is determined based on a timing of communications between the hub and each wireless device of the plurality of nodes. In one example, the scheduled timing of causing the receiver (or receiver functionality of a transceiver) to be operable to receive for at least one wireless device of the nodes is determined based on a timing of a communication being transmitted from the at least one wireless device to the hub.

In one example, the wireless asymmetric network architecture includes a wireless tree asymmetric network architecture. In another example, the wireless asymmetric network architecture includes a wireless tree and mesh asymmetric network architecture.

Figure 16:
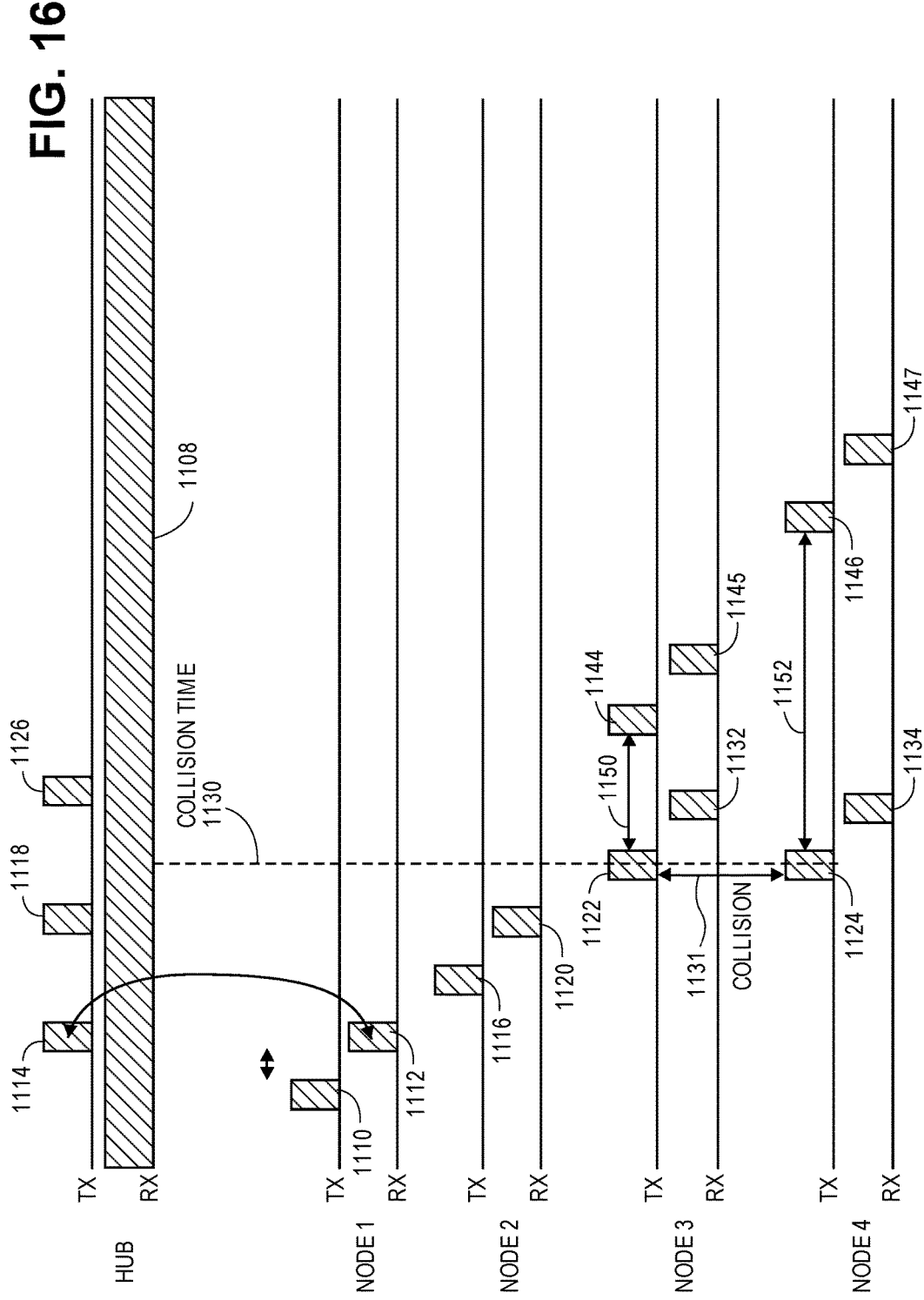
FIG. 16 illustrates a time sequence for shifting transmit and receive communications to avoid collisions of a wireless asymmetric network architecture in accordance with one embodiment.

In one embodiment, the hub may instruct one or more of the nodes to shift the timing of a future transmit/receive communications to avoid collisions on the network. FIG. 16 illustrates a time sequence for shifting transmit and receive communications to avoid collisions of a wireless asymmetric network architecture in accordance with one embodiment. FIG. 16 illustrates transmit and receive time lines for a hub and nodes 1-4 of the wireless asymmetric network architecture. Initially, node 1 transmits a communication to the hub during a transmit window 1110 of the transmit timeline (TX). In this embodiment, the hub listens continuously as illustrated by the continuous receive window 1108 of the hub. The hub then calculates a transmit window minus receive window separation of node 1 to determine a timing for a receive window 1112 of the receive timeline (RX) of node 1. The hub sends a communication to node 1 during transmit window 1114 of the hub and the receive window 1112 of node 1 receives this communication. In other words, a receiver of RF circuitry (or receiver functionality of a transceiver) of wireless device of node 1 is operable to receive during receive window 1112 in order to receive communications.

In a similar manner, the hub communicates or transacts with node 2. Node 2 transmits a communication to the hub during the transmit window 1116 of the transmit timeline (TX) of node 2. The hub then calculates a transmit window minus receive window separation of node 2 to determine a timing for a receive window 1120 of the receive timeline (RX) of node 2. The hub sends a communication to node 2 during a transmit window 1118 of the hub and the receive window 1120 of node 2 receives this communication.

The hub then detects a communication from node 3 during a transmit window 1122 of node 3 and at the same time or approximately the same time also detects a communication from node 4 during a transmit window 1124 of node 4. At this collision time 1130, the hub detects that a collision 1131 has occurred (e.g., when the hub detects that part or all of a transmission is unintelligible or irreversibly garbled). In other words, the communications from node 3 and node 4 combine to form an unintelligible transmission (e.g., an irreversibly garbled transmission) that is received by the hub at or near collision time 1130. The hub then can calculate the next receive window for any of the nodes that transmitted with the unintelligible or garbled transmission during the unintelligible or garbled transmit window (e.g., transmit windows 1122 and 1124). In that next receive window (e.g., receive windows 1132 and 1134) for nodes 3 and 4 or any further subsequent receive windows (e.g., receive windows 1145 and 1147), the hub with transmit window 1126 can instruct the colliding nodes (e.g., nodes 3 and 4 ) to shift their respective transmit and receive windows by different time delays or time periods as illustrated in FIG. 16. In this example, the time delay or shift 1150 from transmit window 1122 to transmit window 1144 of node 3 is less than the time delay or shift 1152 from transmit window 1124 to transmit window 1146 of node 4 in order to avoid a collision based on transmissions during transmit window 1144 and transmit window 1146.

This time delay or shift may be randomly determined using a random number generator in each node, for example, or may be determined and instructed by the hub. The hub may choose from available future windows and offer them as a set to the colliding nodes. These colliding nodes may then choose one of these randomly, for example. Once this selection is made, the collision should be avoided for future windows. On the other hand, if a collision occurs again in the next window (for example, because two of the colliding nodes happened to choose the same time shift), the process can be repeated until all collisions are avoided. In this way, the hub can arbitrate the operation of the entire network without requiring significant complexity from the nodes, thus reducing the energy required for operation of the nodes.

Figure 17:
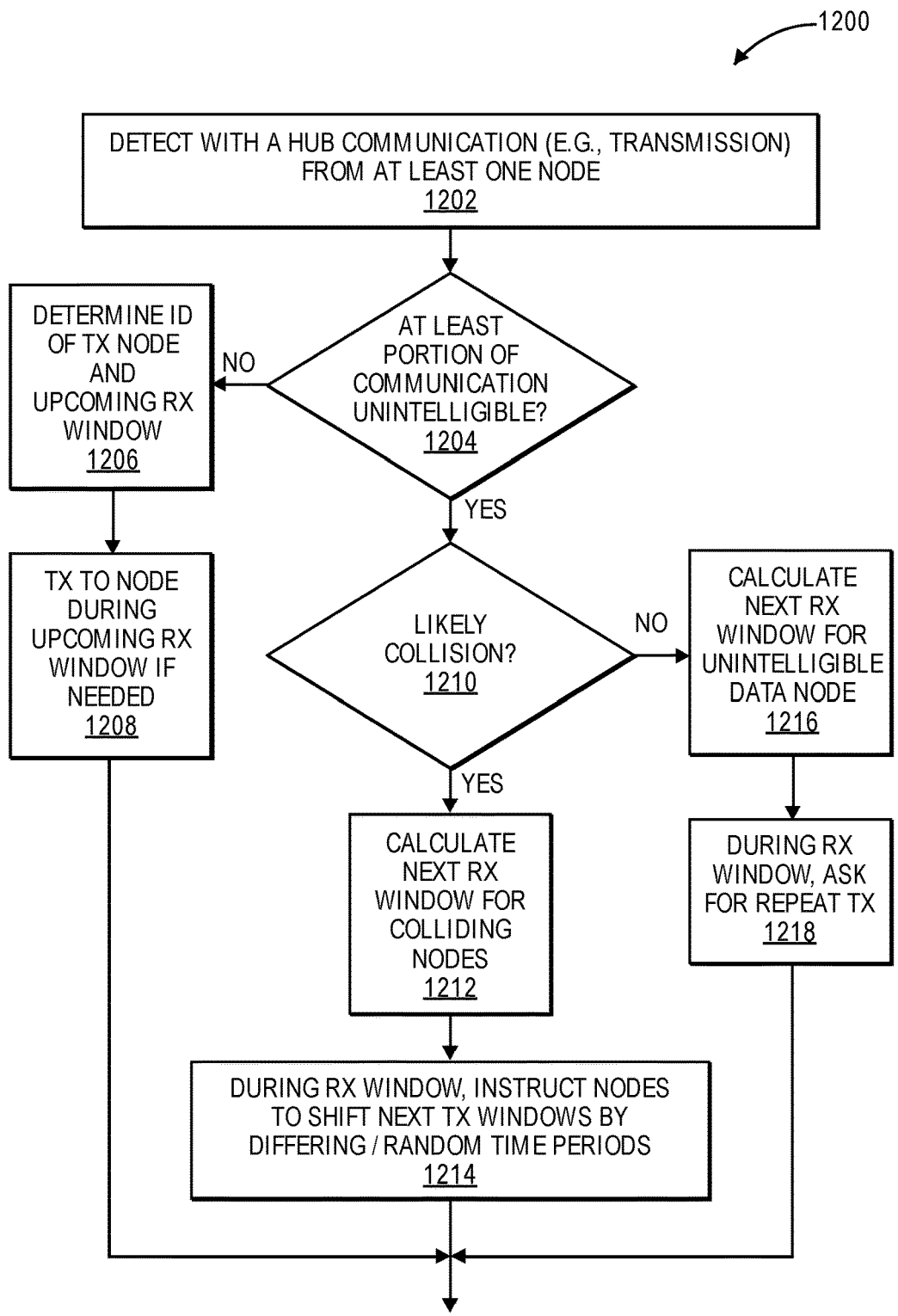
FIG. 17 illustrates a method of arbitration and collision avoidance for communications in a wireless asymmetric network architecture in accordance with one embodiment.

FIG. 17 illustrates a method of arbitration and collision avoidance for communications in a wireless asymmetric network architecture in accordance with one embodiment. The operations of method 1200 may be executed by a wireless device, a wireless control device of a hub (e.g., an apparatus), or system, which includes processing circuitry or processing logic. The processing logic may include hardware (circuitry, dedicated logic, etc.), software (such as is run on a general purpose computer system or a dedicated machine or a device), or a combination of both. In one embodiment, a hub performs the operations of method 1200.

At operation 1202, a receiver (e.g., RF circuitry, receiver functionality of a transceiver) of the hub detects a communication (e.g., transmission) from at least one node of a plurality of nodes within the wireless asymmetric network architecture. Each node includes or is a wireless device with a transmitter and a receiver (or transmitter and receiver functionality of a transceiver) to enable bi-directional communications with the hub to form the wireless asymmetric network architecture. At operation 1204, processing logic of the hub determines whether at least a portion (e.g., 25%, 50%, 75%) of the communication is unintelligible (e.g., garbled, distorted) to processing circuitry of the hub or processing circuitry connected to the hub potentially based on interference from another communication or RF source.

At operation 1206, when the communication is determined to be intelligible, the processing logic of the hub determines an identification of the node that transmitted the communication and also determines a next or subsequent receive window(s) for the transmitting node. At operation 1208, a transmitter (or transmitter functionality of a transceiver) of the hub transmits a communication to this node during the determined next or subsequent receive window(s) if necessary or appropriate.

At operation 1210, when at least a portion of the communication is determined to be unintelligible, the processing logic of the hub determines whether a collision of communications transmitted at approximately the same time from different nodes has likely occurred (e.g., approximately equal to or greater than 50 percent chance of collision occurring). If so, then the processing logic of the hub calculates a next or subsequent receive windows for the colliding nodes at operation 1212. During receive windows of the colliding nodes, the hub (e.g., transmitter of the hub, transmitter functionality of a transceiver of the hub) transmits communications to the colliding nodes with instructions for the nodes to shift a next transmit window by differing time periods or randomly determined time periods. For example, a first node is instructed based on a first communication from the hub to shift a next transmit window by a first time period while a second node is instructed by a second communication from the hub to shift a next transmit window by a second time period. In this example, the first and second periods are sufficiently different to avoid collisions from future transmissions of the first and second nodes.

If the processing logic of the hub determines at operation 1210 that a collision of communications transmitted at approximately the same time from different nodes has likely not occurred, then at operation 1216 the processing logic of the hub determines a next or subsequent receive window for the node that transmitted a communication with at least a portion of the communication being unintelligible to processing circuitry of the hub or processing circuity coupled to the hub. At operation 1218, during the calculated next or subsequent receive window of the node, the processing logic of the hub sends a communication from the hub to the node with the communication requesting a repeat transmission of the earlier communication from the node.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A system for providing a wireless asymmetric network architecture, comprising:
   a first hub having a wireless control device that is configured to control communications and power consumption in the wireless asymmetric network architecture; and
   a first plurality of sensor nodes each having a wireless device with a transmitter and a receiver to enable bi-directional wireless communications with the wireless control device of the first hub in the wireless asymmetric network architecture, wherein the wireless control device is configured to determine a timing separation between a transmit window and a receive window of each wireless device of the first plurality of sensor nodes and to determine a timeslot definition signal that is defined with a first scheduled timing of causing the transmitter to be operable to transmit wireless communications during a transmit window and causing the receiver to be operable to receive wireless communications during a separate receive window for each wireless device of the first plurality of sensor nodes based on the timing separation and a periodic beacon signal of the first hub, wherein the timeslot definition signal is separate from the periodic beacon signal.

2. The system of claim 1, wherein the first hub is powered by a mains electrical source and the first plurality of sensor nodes are each powered by a battery source to form the wireless asymmetric network, wherein an asymmetry of available power for the first hub and the first plurality of sensor nodes is exploited to enhance battery life and communication range in the wireless asymmetric network of the first plurality of sensor nodes based on low-duty cycle networking to reduce transmission-related energy consumption of the first plurality of sensor nodes.

3. The system of claim 1, wherein the first scheduled timing of causing the transmitter to be operable to transmit and causing the receiver to be operable to receive for each wireless device of the first plurality of sensor nodes is determined based on a timing relationship between the periodic beacon signal and communications of the first plurality of sensor nodes.

4. The system of claim 1, wherein the first hub provides anti-collision features by determining a different second scheduled timing of causing the transmitter to be operable to transmit and causing the receiver to be operable to receive for at least two wireless devices of the first plurality of sensor nodes upon detection of a collision or detection of a new sensor node, wherein the first hub transmits the periodic beacon signal initially with the first scheduled timing and subsequently with the different second scheduled timing upon detection of a collision or detection of a new sensor node.

5. The system of claim 4, further comprising:
a second hub having a wireless control device that is configured to control communications and power consumption in the wireless asymmetric network architecture; and
a second plurality of nodes each having a wireless device with a transmitter and a receiver to enable bi-directional communications with the wireless control device of the second hub in the wireless asymmetric network architecture, wherein the wireless control device of the second control device is configured to determine a third scheduled timing of causing the transmitter to be operable to transmit and causing the receiver to be operable to receive for each wireless device of the second plurality of nodes to reduce power consumption of the wireless devices of the second plurality of nodes.

6. The system of claim 5, wherein determining the different second scheduled timing comprises determining of at least one unintelligible communication based on receiving at least a portion of a communication that is unintelligible and then determining a likelihood of the at least one unintelligible communication being caused by a collision of communications transmitted at approximately the same time from different nodes.

7. The system of claim 5, wherein the second hub having the wireless control device is configured to send communications to the first hub and to receive communications from the first hub for controlling and monitoring the wireless asymmetric network architecture.

8. An apparatus for providing a wireless asymmetric network architecture, comprising:
a memory for storing instructions;
one or more processing units to execute instructions to establish and control communications in a wireless asymmetric network; and
radio frequency (RF) circuitry to transmit and receive communications in the wireless asymmetric network, the RF circuitry to transmit communications to a plurality of sensor nodes each having a wireless device with a transmitter and a receiver to enable bi-directional communications with the RF circuitry of the apparatus in the wireless asymmetric network, wherein the one or more processing units are configured to execute instructions to determine a timing separation between a transmit window and a receive window of each wireless device of the plurality of sensor nodes and to determine a timeslot definition signal that is defined with a first scheduled timing of causing the transmitter to be operable to transmit wireless communications during a transmit window and causing the receiver to be operable to receive wireless communications during a separate receive window for each wireless device of the plurality of sensor nodes based on the timing separation and a periodic beacon signal of the apparatus, wherein the timeslot definition signal is separate from the periodic beacon signal.

9. The apparatus of claim 8, wherein the apparatus is powered by a mains electrical source and the plurality of sensor nodes are each powered by a battery source or another energy source to form the wireless asymmetric network, wherein an asymmetry of available power for the apparatus and the plurality of sensor nodes is exploited to enhance battery life and communication range in the wireless asymmetric network of the first plurality of sensor nodes based on low-duty cycle networking to reduce transmission-related energy consumption of the plurality of sensor nodes.

10. The apparatus of claim 8, wherein the first scheduled timing of causing the transmitter to be operable to transmit and causing the receiver to be operable to receive for each wireless device of the plurality of sensor nodes is determined based on a timing relationship between the periodic beacon signal and communications of the plurality of nodes.

11. The apparatus of claim 8, wherein the apparatus provides anti-collision features by determining a different second scheduled timing of causing the transmitter to be operable to transmit and causing the receiver to be operable to receive for at least two wireless devices of the plurality of sensor nodes upon detection of a collision or detection of a new node, wherein the apparatus transmits the periodic beacon signal initially with the first scheduled timing and subsequently with the second scheduled timing upon detection of a collision or detection of a new node.

12. The apparatus of claim 11, wherein determining the different second scheduled timing comprises determining of at least one unintelligible communication based on receiving at least a portion of a communication that is unintelligible and then determining a likelihood of the at least one unintelligible communication being caused by a collision of communications transmitted at approximately the same time from different nodes.

13. A method for reducing power consumption in a wireless asymmetric network architecture, comprising:
transmitting, with processing logic including hardware of a hub, a periodic beacon signal to a plurality of sensor nodes each having a wireless device with a transmitter and a receiver to enable bi-directional wireless communications with the hub to form the wireless asymmetric network architecture;
receiving, with the processing logic including hardware of the hub, wireless communications from the plurality of sensor nodes; and
determining, with the processing logic of the hub, a timing separation between a transmit window and a receive window of each wireless device of the plurality of sensor nodes and a timeslot definition signal that is defined with a first scheduled timing of causing the transmitter to be operable to transmit wireless communications during a transmit window and causing the receiver to be operable to receive wireless communications during a separate receive window for each wireless device based on the timing separation and the periodic beacon signal and at least one received wireless communication from a sensor node, wherein the timeslot definition signal is separate from the periodic beacon signal.

14. The method of claim 13, further comprising:
determining a different second scheduled timing of causing the transmitter to be operable to transmit and causing the receiver to be operable to receive for at least two wireless devices of the plurality of sensor nodes upon initially receiving a communication from at least one new node or upon receiving at least one unintelligible communication during the first scheduled timing from at least one wireless device of the plurality of sensor nodes.

15. The method of claim 13, further comprising:
transmitting, with the processing logic of the hub, a non-repeating time slot definition signal to define time slots for the first scheduled timing.

16. The method of claim 15 wherein the hub transmits at least one of the periodic beacon signal initially and the time slot definition signal with the first scheduled timing and subsequently the beacon signal includes the second scheduled timing upon detection of a collision or detection of a new node.

17. The method of claim 13, wherein the first scheduled timing of causing the transmitter to be operable to transmit and causing the receiver to be operable to receive for each wireless device of the plurality of nodes is determined based on a timing relationship between the periodic beacon signal and communications of the plurality of nodes.

18. A sensor node for a wireless network architecture, comprising:
at least one sensor;
a memory for storing instructions;
processing logic coupled to the memory and the at least one sensor, the processing logic to execute instructions for processing data received from the at least one sensor and for processing communications for the sensor node; and
radio frequency (RF) circuitry coupled to the processing logic, the RF circuitry includes transmitter and receiver functionality to transmit communications to a hub and to receive communications from the hub in the wireless network architecture, wherein the processing logic is configured to execute instructions to receive a periodic beacon signal from the hub and to receive a timeslot definition signal that is defined with a first scheduled timing of causing the transmitter functionality to be operable to transmit wireless communications during a transmit window and causing the receiver functionality to be operable to receive wireless communications during a separate receive window based on a timing separation between the transmit window and the receive window of the sensor node and the periodic beacon signal, wherein the timeslot definition signal is separate from the periodic beacon signal.

19. The sensor node of claim 18, wherein the timeslot definition signal is a non-repeating time slot definition signal to define time slots for the first scheduled timing.

20. The sensor node of claim 14, wherein the processing logic of the sensor node is configured to receive a different second scheduled timing of causing the transmitter functionality to be operable to transmit and causing the receiver functionality to be operable to receive.

* * * * *